US006331668B1

(12) United States Patent
Michero

(10) Patent No.: US 6,331,668 B1
(45) Date of Patent: Dec. 18, 2001

(54) METHOD AND DEVICE FOR MUSICAL REFERENCE

(76) Inventor: Thomas Michero, P.O. Box 5552, Austin, TX (US) 78763

( * ) Notice: Subject to any disclaimer, the term of this patent is extended or adjusted under 35 U.S.C. 154(b) by 0 days.

(21) Appl. No.: 09/631,852

(22) Filed: Aug. 3, 2000

(51) Int. Cl.$^7$ .................................................. G09B 15/02
(52) U.S. Cl. ............................. 84/477 R; 84/480; 84/613
(58) Field of Search ................................ 84/477 R, 480, 84/482, 613, 637, 650

(56) References Cited

U.S. PATENT DOCUMENTS

| | | | |
|---|---|---|---|
| 2,958,251 | * | 11/1960 | Calabro . |
| 3,748,947 | * | 7/1973 | Freiheit .......................... 84/477 R X |
| 4,069,735 | * | 1/1978 | Bertram .................................. 84/474 |
| 4,305,323 | * | 12/1981 | Graham .................................. 84/474 |
| 4,960,029 | * | 10/1990 | Nelson .................................. 84/473 |
| 4,961,362 | * | 10/1990 | Gunn .................................... 84/474 |
| 5,440,071 | * | 8/1995 | Johnson ............................... 84/637 |
| 5,709,552 | * | 1/1998 | LeGrange .......................... 84/474 X |
| 5,723,803 | * | 3/1998 | Kurakake ....................... 84/477 R X |
| 6,023,017 | * | 2/2000 | Minowa et al. ...................... 84/637 |
| 6,031,172 | * | 2/2000 | Papadopoulos ................... 84/470 R |
| 6,100,462 | * | 8/2000 | Aoki ...................................... 84/613 |
| 6,107,557 | * | 8/2000 | Fukada . |
| 6,175,069 | * | 1/2001 | Longacre ....................... 84/470 R X |

OTHER PUBLICATIONS

Ex Parte S. (Board of Appeals) Aug. 4, 1943, Case # 109, 25 Journal of the Patent and Trademark Office Society 904.*

* cited by examiner

Primary Examiner—Jeffrey Donels
(74) Attorney, Agent, or Firm—Conley, Rose & Tayon, PC

(57) ABSTRACT

A method and device to aid musicians interested in composition, improvisation, and music theory. Various embodiments provide interactive reference tools that organize musical concepts including chord harmonies, chord progressions, cord substitutions, modes, key transpositions, and alternative scales, illustrating how these aspects of music theory are related. A cylindrical first surface having presented upon it musical information in the form of columns of note values and/or intervals may be positioned inside a cylindrical second surface. A second surface, a cylindrical sleeve, may have presented upon it one or more music reference tools which display music theoretic forms and structures in a key-independent manner. The surfaces may comprise printable surfaces on which the musical information and reference tools may be printed, or a digital display device on which the musical information and reference tools may be displayed. The second surface may be proximate to the first surface such that the second surface may be operable to slide over the first surface. The second surface may include various transparent and opaque areas, such that when the second surface is moved over the first surface, a portion of the musical information on the first surface may be viewable through the transparent areas of the second surface. The music reference tools and the viewable portion of the musical information may be operable to display music theoretic forms for particular keys, wherein the key-specific music theoretic forms vary as a function of the position of the second surface with respect to the first surface.

89 Claims, 16 Drawing Sheets

METHOD AND DEVICE FOR MUSICAL REFERENCE

BACKGROUND OF THE INVENTION

1. Field of the Invention

The present invention relates generally to the field of musical reference, and specifically to the area of integrated musical reference tools.

2. Description of the Relevant Art

The most common approaches towards presenting musical reference information include devices based upon wheels or slides. Typically, in such devices, a sheet containing raw musical data, often in sequential format such as rows and/or columns, passes beneath a perforated cover to reveal part of the data. The perforated cover displays reference information which, in conjunction with the revealed subset of data on the data sheet, provides musical reference information. The musical reference information may be presented in a variety of musical keys, depending upon the relative positions of the data sheet and the perforated cover. In the wheel format, the data sheet rotates around a pivot point. In the slide format, the sheets simply slides back and forth under the perforated cover.

With these approaches, a single device generally expresses a single aspect of music theory, such as chord construction, scale building, or transposition. In other words, these approaches do not present integrated music theory concepts but instead feature distinct aspects of music theory or musical reference on separate wheels or slides. The layouts on the wheel-type approach are typically radial and are thus limited due to the space requirements of a circular format. The slide-type approach tends to be linear in layout but limited in usable area due to accommodation of the extra length of the slide.

Due to the drawbacks of the existing approaches discussed above, an improved method and device for presenting musical reference information are needed.

SUMMARY OF THE INVENTION

The present invention provides various embodiments of tools to aid musicians interested in composition, improvisation, and music theory. Various embodiments provide interactive reference tools that organize musical concepts including chord harmonies, chord progressions, cord substitutions, modes, key transpositions, and alternative scales, illustrating how all these aspects of music theory are related. In one embodiment, a cylindrical first surface may be positioned inside a cylindrical second surface. The cylindrical first surface may have presented upon it musical information in the form of columns of note values and/or intervals. The second surface, a cylindrical sleeve, may have presented upon it one or more music reference tools which display music theoretic forms and structures in a key-independent manner. In various embodiments, the surfaces may comprise printable surfaces on which the musical information and reference tools may be printed, or a digital display device on which the musical information and reference tools may be displayed. The second surface, in various embodiments, may be proximate to the first surface such that the second surface may be operable to slide over the first surface. The second surface may also include various transparent and opaque areas, such that when the second surface is moved over the first surface, a portion of the musical information on the first surface may be viewable through the transparent areas of the second surface. In combination, the music reference tools and the viewable portion of the musical information may be operable to display music theoretic forms and structures for particular keys, wherein the key-specific music theoretic forms and structures vary as a function of the position of the second surface with respect to the first surface. Suitable construction materials may include paper, plastic, metal, wood, and any other suitable material. The musical reference device in a hollow cylindrical embodiment may provide a special compartment for the storage of small objects, e.g., an accompanying booklet on music theory, guitar picks, etc. along with other second surfaces. In various other embodiments, the musical reference device may be implemented with flat surfaces, such as a wheel, dial, or sliding rule. In one embodiment, the musical reference device includes, but is not limited to, one or more of the following tools: a harmonized diatonic scale calculator, a chord substitution selector, a chord progression map, a chord modulator, an alternate scale selector, a key transposer and interval counter, a scale forms reference, a tetrachord reference, a common root chord reference, a common key chord reference, and a circle of fifths and clefs reminder.

The harmonized diatonic scale calculator displays the harmonized diatonic scale in every key. The notes of each diatonic mode may be displayed showing their natural sequence of tones from the tonic to the thirteenth step. The roots for each mode may be determined by the notes of the diatonic scale. The harmonized diatonic scale calculator may be marked with major and minor intervals (and combinations) to aid the musician with chord construction and teach the student the building blocks of chord structure. The outer second surface may be interchangeable with other sleeves that harmonize alternate scales, e.g., harmonic and melodic minor scales.

The chord substitution selector shows chords that may be substituted for any given chord within a given key without violating accepted rules of harmony. A musician may use this section to select chords that offer different harmonic voicing to chords that naturally occur in that key. This tool is designed to reveal the proper substitution without the musician needing to be knowledgeable about the rules of chord substitution and helps the musician develop harmony around a given melody or change the sound of an existing piece of music.

A chord progression map may include a diagram of a plurality of chords with connections from each of the chords to one or more other of the chords, wherein the connections may be sequences of one or more intervening lines, such that any chord is reachable from any other chord by traversal of the intervening lines and chords. A user may select a beginning chord and an ending chord from the plurality of chords, and by traversing the chord progression map from the starting chord to the ending chord along a path of intervening lines, generate a sequence of chords, comprising the starting chord, any intervening chords, and the ending chord. When the second surface is moved with respect to the first surface, the chord progression map may be displayed in a plurality of keys as a function of the musical information and the relative position of the second surface with the first surface. As long as the path between chords is followed the resulting harmony will follow standard rules. The circle of fifths shows the relationship between notes separated by two common intervals, namely 4ths and 5ths.

Chord modulation refers to the ways in which a musician can change keys while playing a piece of music. Two principles of modulation are illustrated: diatonic and chromatic. Diatonic modulation works by moving from key to key by playing chords that are common to both keys. Chromatic modulation refers to changing one note of an existing chord to match the key signature of the key the harmony moves toward. The chord modulator represents the modulation techniques to graphically allow quick identification of the chords that achieve the proper modulation.

The key transposer may allow the musician to transpose music note for note from one key to another. This is an especially helpful tool for the composer who must write music for different instruments. The interval counter tells the musician the interval between the original key and the new key and may also display the name of the interval between any two notes. In one embodiment, the musical reference device may include a clefs reminder showing four octaves of the C scale represented on the bass and treble clef.

The major diatonic scale tool illustrates basic terminology which may be essential to comprehending all other elements of music theory. Because scales are often described by the number of sharps or flats they contain, this tool displays this information for each key.

The modes tool shows the modes that relate to the diatonic scale represented in the section above. These modes are essentially the major scale started and stopped on different notes of the given scale. The modes tool labels and lays out these modes to show the chromatic steps that make up each mode.

The scale forms reference tool displays the notes in each scale form and the chromatic steps that make up those scales, allowing the user to see the relationships between different scale forms.

The tetrachord tool, a four-note chord consisting of two whole steps and a half step, is the basis of the diatonic scale. This pattern repeats up and down the chromatic scale to create the twelve separate major keys used in Western music.

The common root chord reference tool displays chords relating to a common tonic root, which is another way to study chords. The common root chord reference tool shows the most commonly occurring chords that share the same root and the intervals that comprise them.

The common key chord reference tool emphasizes the intervals that make up each chord, namely major and minor, and demonstrates the principle of polychords. The pattern of chord construction is the same in every key, so when the chord reference tool is dialed to a particular key, the chords harmonically associated with that key are revealed by a grid design that indicates the notes that make up that particular chord.

In various embodiments, the above-mentioned tools might be grouped together in various ways. For example, the reference tools associated with the harmonic aspects of Western music may be grouped together in a music reference device which may be called the Harmonizer, emphasizing the harmonized diatonic scale and organizing musical concepts including chord harmonies, chord progressions, cord substitutions, modes, key transpositions, and alternative scales. An alternate embodiment primarily concerned with chord theory might be referred to as the Chordographer, emphasizing chord construction by displaying the intervals that make up each chord and how each chord relates to others in a given key. Another embodiment might specifically relate to scales and be referred to as the Scaleographer, emphasizing scale patterns by displaying several common scales and modes that musicians should know. In various embodiments, the various groupings of tools such as the Harmonizer, the Chordographer, and the Scaleographer may be provided on interchangeable sets of first and second surfaces which may be used with a single cylinder.

The concepts of the musical reference device may be expressed in other embodiments as well, such as a hand-held electronic device, a software program to be run on a computer, or an analog device that is based on a scroll rather than a cylinder.

In one embodiment of the invention, each graphical musical tool may be presented on a computer screen in a separate window, allowing multiple tools to be viewed and used concurrently. In another embodiment, one tool at a time may be used by selecting it from a menu or toolbar, or by selecting an icon with a pointing device such as a mouse. The musical key selection for a tool may be made by selecting a value from a display via a pointing device, in one embodiment. In another embodiment, the musical key selection for a tool may be input into a variable field. In yet another embodiment, the musical key selection may be made by scrolling through the musical key data values until a desired value is visible in the appropriate data field.

In one embodiment, the invention uses a scrolling mechanism. A second surface may be held fixed above a first surface which may be operable to scroll under the second surface. The first surface may present musical information in the form of columns and rows of note and interval values, while the second surface may comprise various musical reference tools with perforations or transparent areas which allow selected elements on the first surface to be visible to the user in the context of a musical reference tool on the second surface. The particular values of musical information viewed may be selected by scrolling the first surface until the desired values appear in the viewing areas of the second surface, i.e., the musical reference tools. In one embodiment, a plurality of different musical reference tools may be presented on the second surface.

In one embodiment, the device may have interchangeable parts that allow other non-diatonic scales to be harmonized, or reference tools designed to address the individual characteristics of musical instruments. (e.g., chord finger or tabulature for a guitar). In one embodiment, the device may include electronics that produce the sound of selected notes and chords.

BRIEF DESCRIPTION OF THE DRAWINGS

Other objects and advantages of the invention will become apparent upon reading the following detailed description and upon reference to the accompanying drawings in which:

FIG. 4 is an illustration of a musical reference device data sheet according to one embodiment.

FIG. 8 is an illustration of a musical reference device data sheet according to one embodiment.

FIG. 11 is an illustration of a musical reference device data sheet according to one embodiment.

Figure 1:
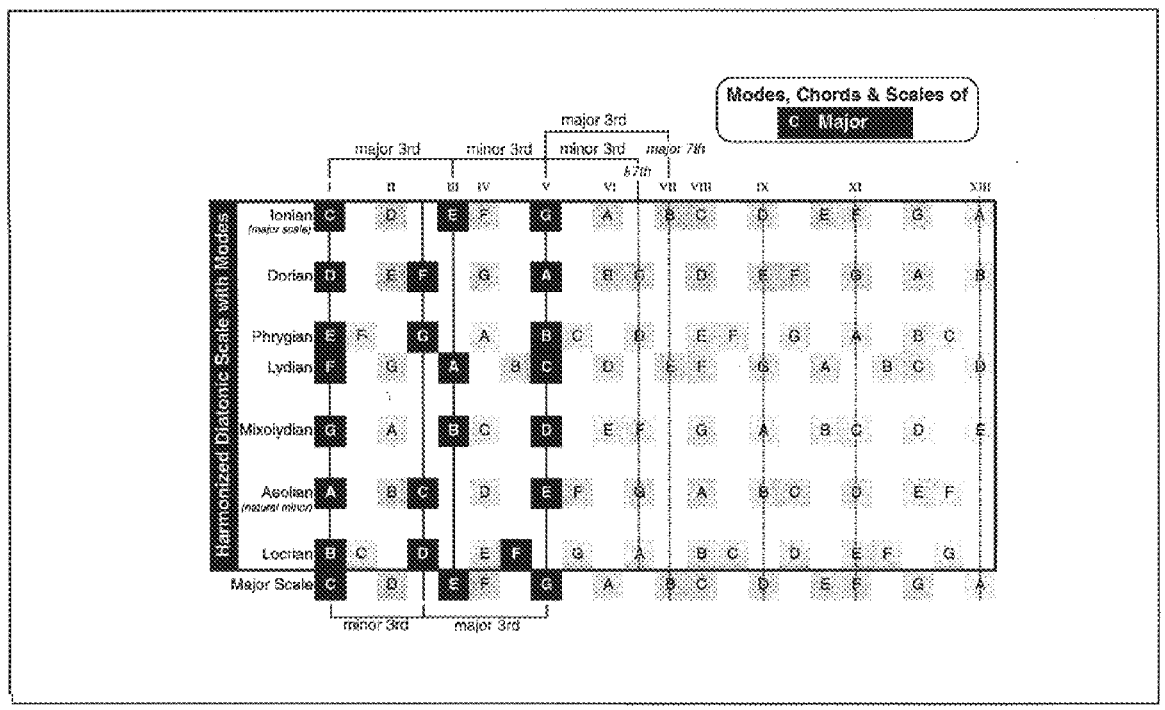
FIG. 1 is an illustration of a harmonized diatonic scale calculator according to one embodiment.

While the invention is susceptible to various modifications and alternative forms, specific embodiments thereof are shown by way of example in the drawings and will herein be described in detail. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF SEVERAL EMBODIMENTS

Various embodiments of the musical reference device provide tools to aid musicians interested in composition, improvisation, and music theory. Various embodiments of the musical reference device may show the relationship between scales, modes, chords, and intervals with a unique arrangement of music theory elements. The musical reference device's unique graphic layout demonstrates musical concepts and patterns with an easy-to-understand visual presentation. The visual and interactive nature of the musical reference device may be used to reinforce a student's musical education by creating a visual and kinesthetic experience. The musical reference device may also be referred to as a music theory dialer.

FIG. 12: Musical Reference Device Construction

Figure 4:
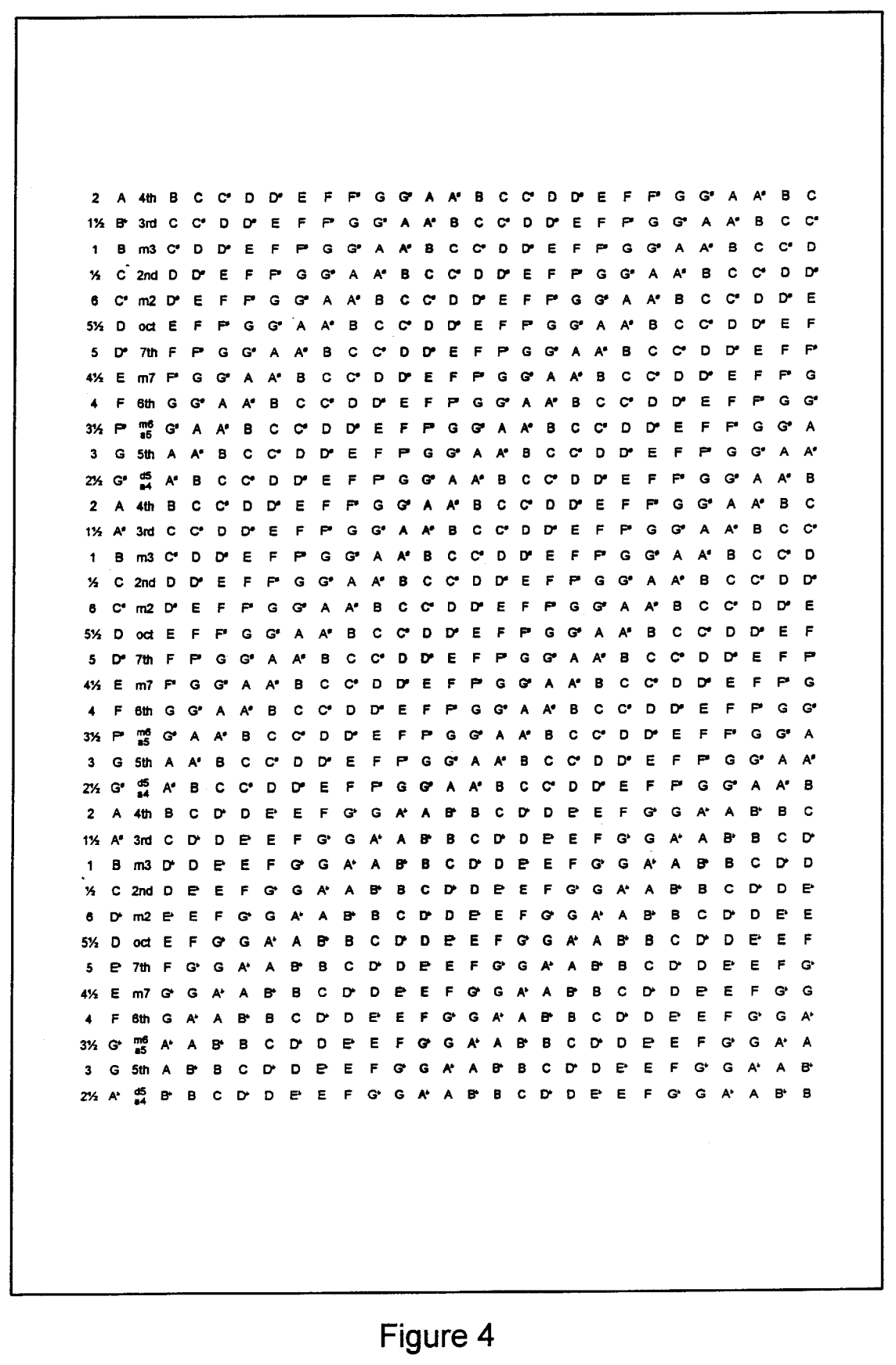
Figure 8:
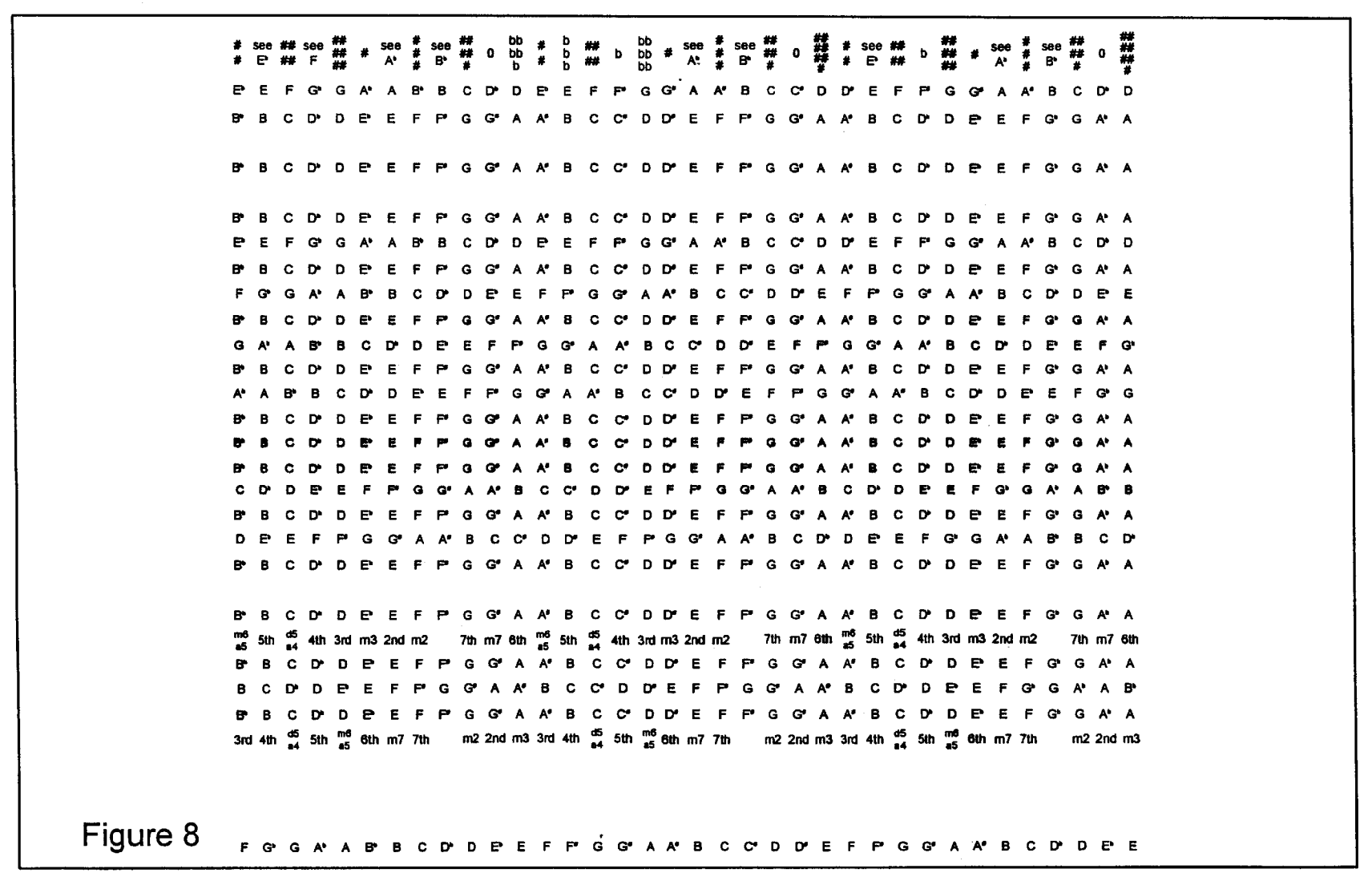
Figure 11:
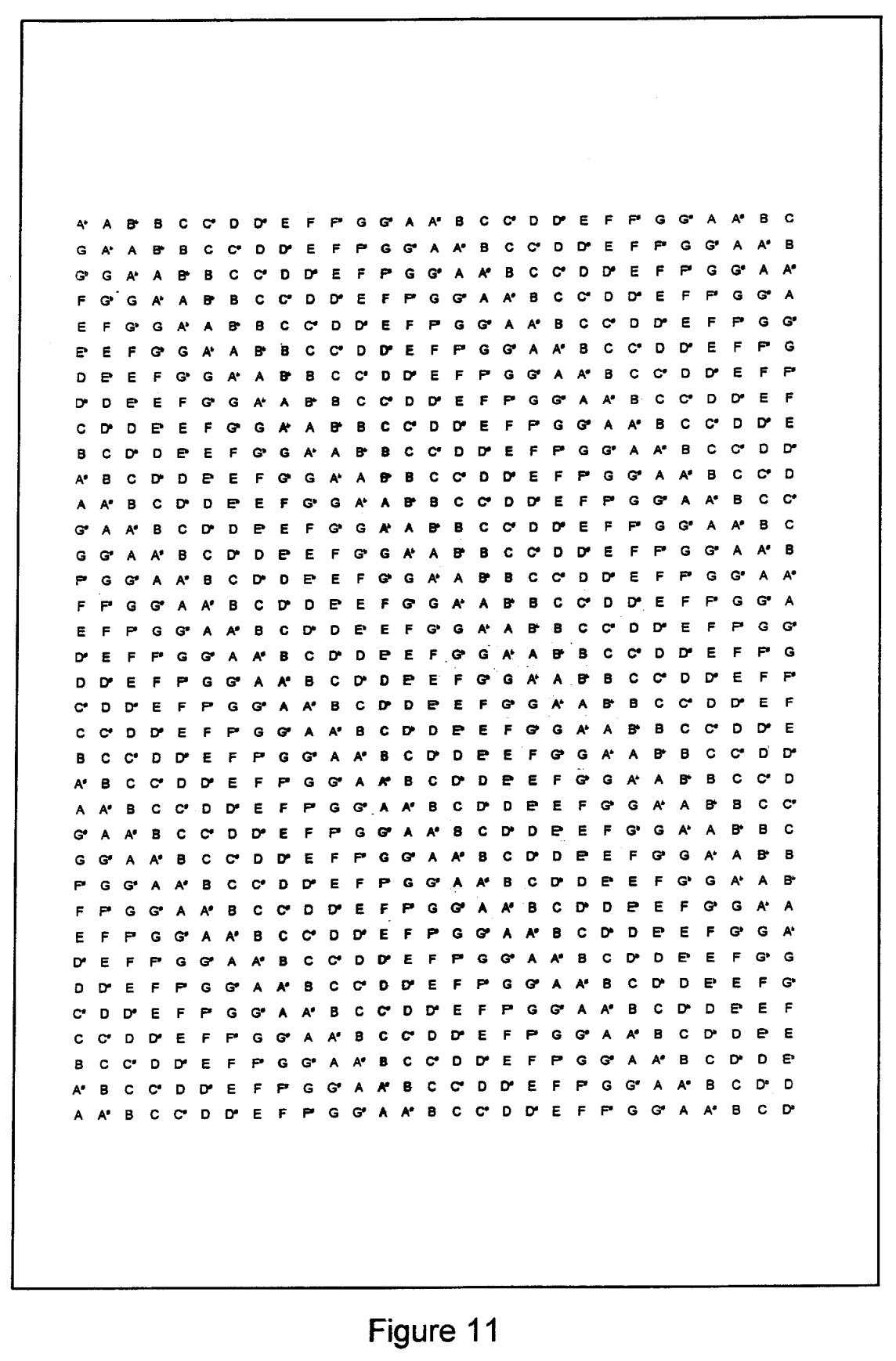
Figure 12A:
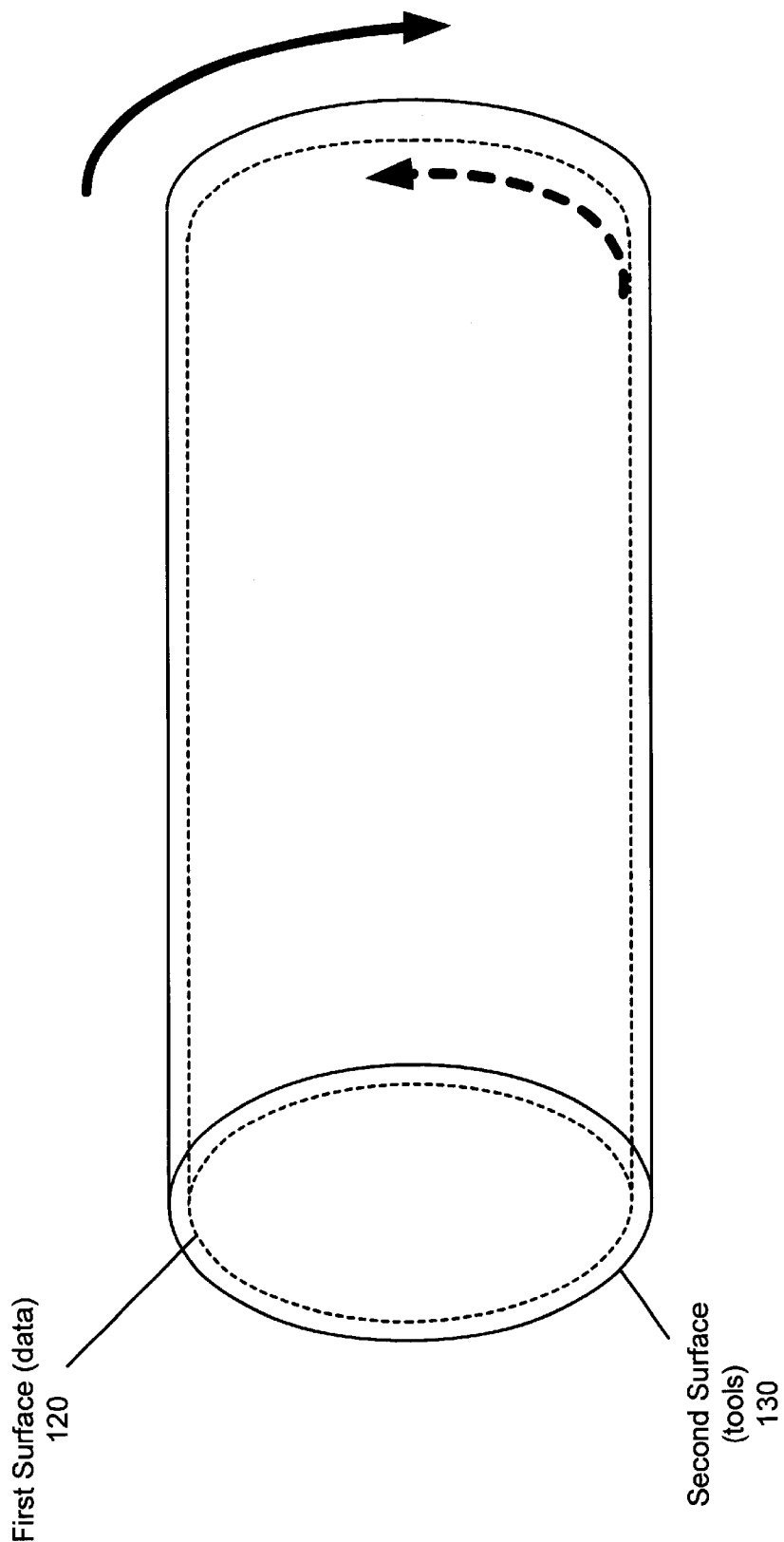
FIGS. 12A–C are illustrations of the cylindrical construction of a musical reference device according to one embodiment.
Figure 12B:
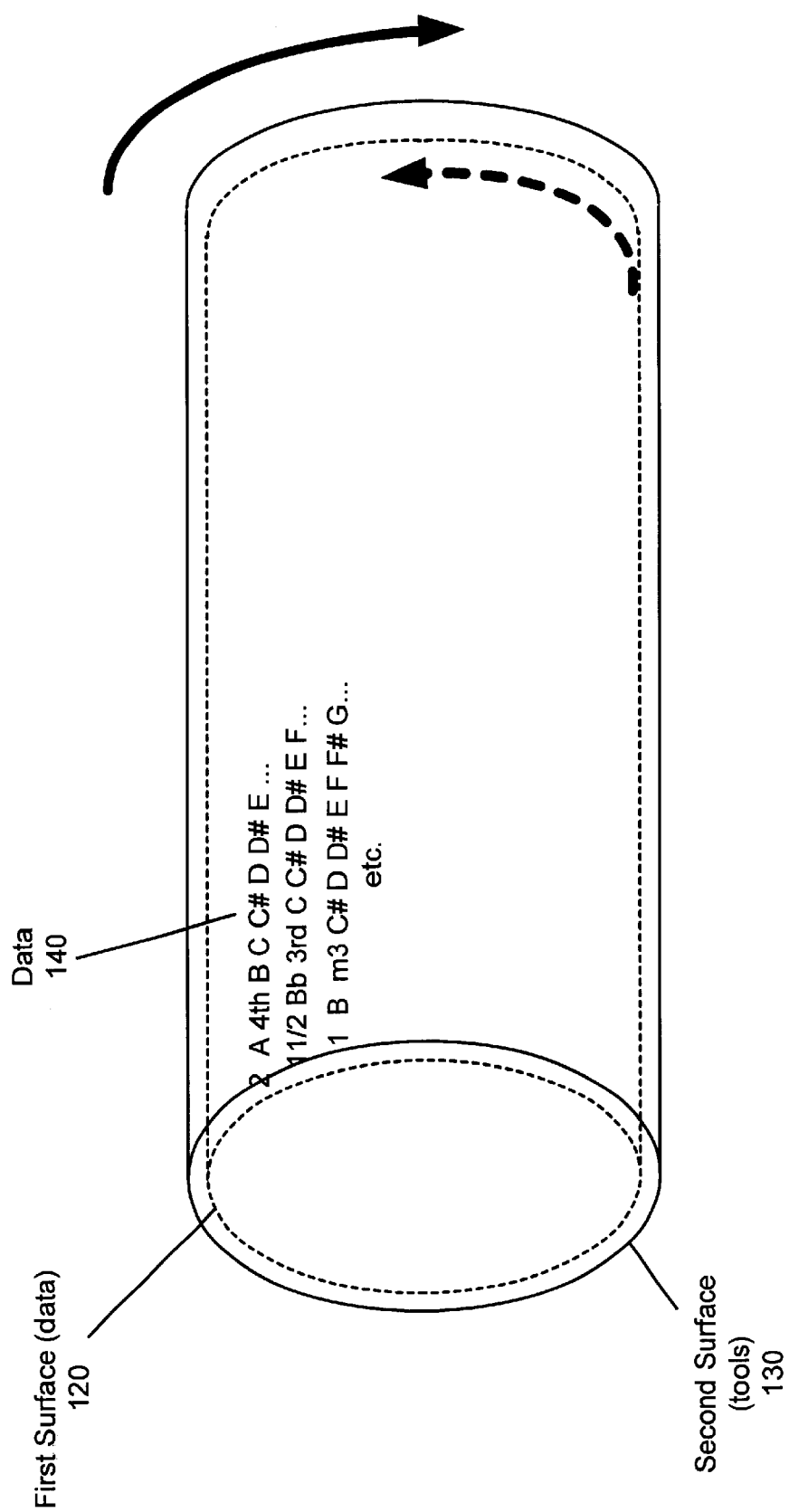
Figure 12C:
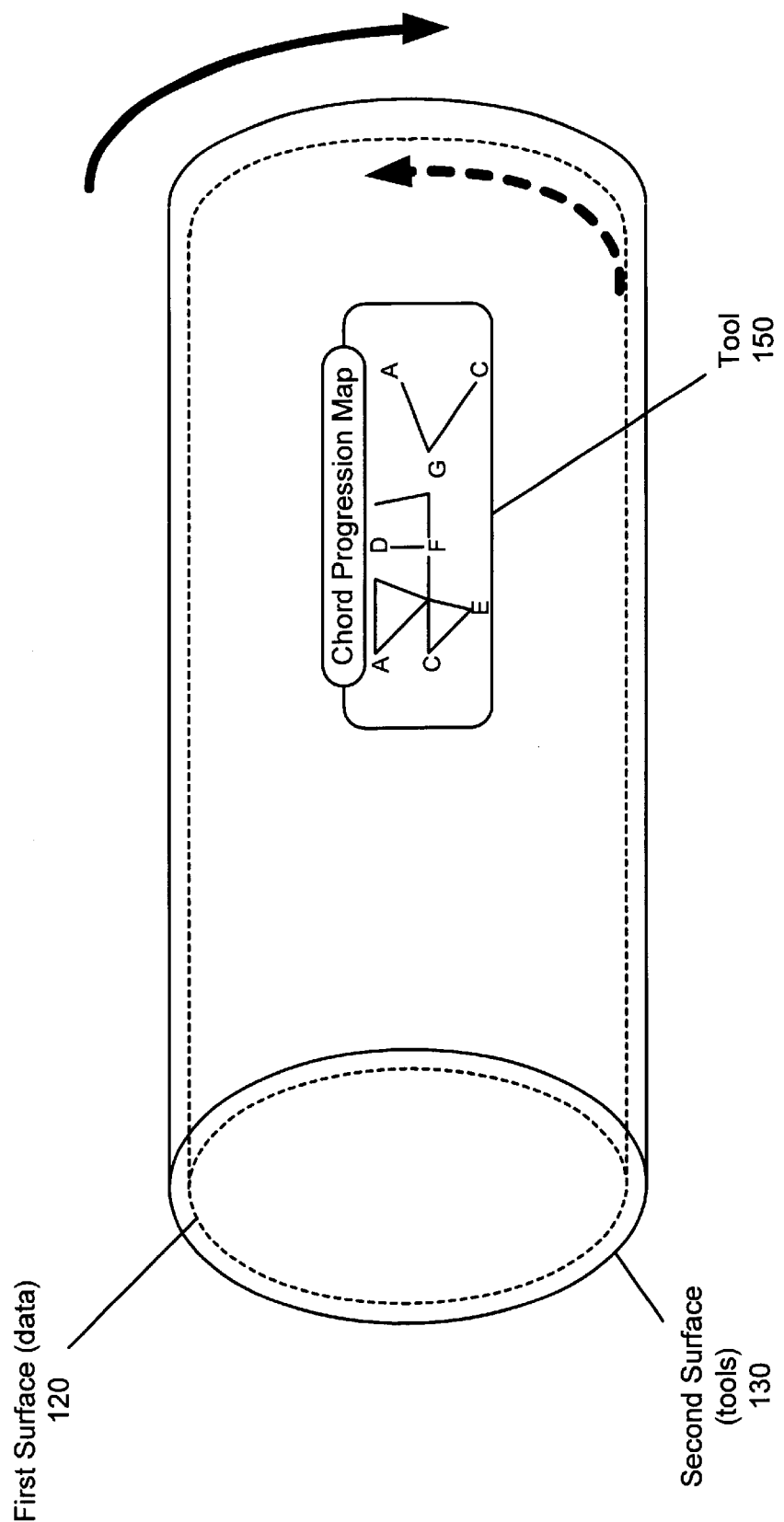

FIGS. 12A–C illustrate a cylindrical form of the musical reference device according to one embodiment. As FIG. 12A shows, a cylindrical first surface 120 may be positioned inside a cylindrical second surface 130. The cylindrical first surface 120 may have presented upon it musical information 140 in the form of columns of note values and/or intervals, as illustrated by FIG. 12B. As used herein, the term "musical information" may include fundamental elements of musical notation and theory, such as note values, intervals, rules of harmony, and other suitable elements, in various musical systems such as Western diatonic-scale-based music. The musical information may be presented in an organized form, such as a table having a plurality of columns. Examples of suitable sets of musical information are shown in FIGS. 4, 8, and 11. In various embodiments, the first surface 120 may comprise a surface on which musical information may be printed or a digital display device on which musical information may be displayed.

As FIG. 12C shows, the second surface 130, a cylindrical sleeve, may have presented upon it one or more music reference tools 150 which may display music theoretic forms and structures in a key-independent manner. As used herein, the term "music reference tool" may include any tool, diagram, graph, table, map, chart, or other suitable form which illustrates any feature, concept, or idea (or combination of such) which is related to music theory or practice. As used herein, "musical reference" includes a use of such a tool for a purpose including education, tutoring, reference, and other suitable purposes. Examples of the music reference tools are discussed with reference to FIGS. 1–3, 5–7, 9, and 10. In various embodiments, the second surface may comprise a surface on which music reference tools are printed or a digital display device on which music reference tools are displayed. As illustrated in FIGS. 12A–C, the second surface 130, in various embodiments, may be proximate to the first surface 120 such that the second surface 130 may be operable to slide over the first surface 120. The second surface 130 may also include various transparent and opaque portions, such that when the second surface 130 is moved over the first surface 120, a portion of the musical information 140 on the first surface 120 may be viewable through the transparent portions of the second surface 130. In combination, the music reference tools 150 and the viewable portion of the musical information are operable to display music theoretic forms and structures for particular keys, wherein the key-specific music theoretic forms and structures vary as a function of the position of the second surface 130 with respect to the first surface 120.

In one embodiment, the first surface may the outer surface of a first three-dimensional object. The second surface may be the surface of a second three-dimensional object. As used herein, a "three-dimensional object" includes any object whose shape requires three sets of geometric coordinates to describe. For example, a three-dimensional object may include a sheet of paper or other flexible material which is curved into a substantially cylindrical shape. One or more of the first three-dimensional object and the second three-dimensional object may be moveable, relative to the other of the objects, to enable respective portions of the musical information to be aligned with the one or more transparent portions to enable the respective portions of the musical information to be viewed by a user.

In one embodiment, the musical reference device may include a cylinder which is printed with data and covered by a sleeve, wherein the sleeve may be perforated in strategic locations to reveal the data relating to a selected key. The sleeve that covers the data cylinder may be printed with information that, when combined with the data, expresses the music theory and music reference concepts. The sleeve may slide or rotate around the data cylinder as shown in FIGS. 12A-C to present the different key-related information. Suitable construction materials may include paper, plastic, metal, wood, and any other suitable material. The musical reference device's unique cylindrical shape may allow the information to be presented in a natural and convenient fashion, with very efficient use of space.

In addition, the musical reference device in a hollow cylindrical embodiment may provide a special compartment for the storage of small objects, e.g., an accompanying booklet on music theory, guitar picks, other second surfaces, and other suitable objects.

In various other embodiments, the musical reference device may be implemented with two or more flat surfaces, such as a wheel, dial, or sliding rule. In a wheel embodiment, for example, a second flat surface displaying one or more music reference tools may be placed on top of a first flat surface displaying musical information. The second flat surface may rotate freely about a centrally located axis.

Figure 14:
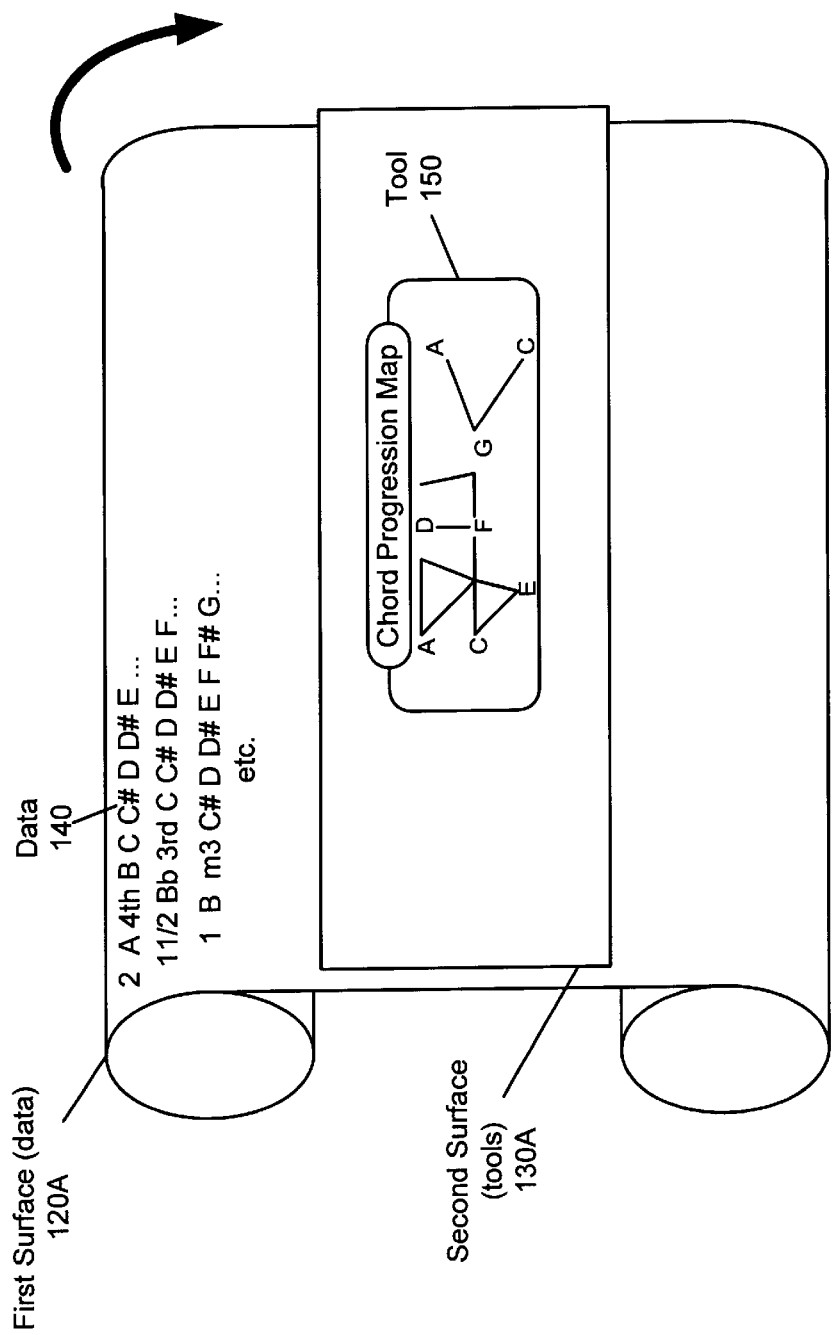
FIG. 14 is an illustration of a scroll-based embodiment of the musical reference device according to one embodiment.

FIG. 14: A Scroll Embodiment Of The System

FIG. 14 illustrates an embodiment of the invention using a scrolling mechanism. As FIG. 14 shows, second surface 130A may be held fixed above first surface 120A, which may be operable to scroll under second surface 130A. As described above with reference to FIGS. 12 A–C, first surface 120A may present musical information 140 in the form of columns and rows of note and interval values, while second surface 130A may comprise various musical reference tools 150 with perforations or transparent areas which allow selected elements on the first surface 120A to be visible to the user in the context of a musical reference tool on the second surface 130A. The particular values of musical information viewed may be selected by scrolling the first surface 120A until the desired values appear in the viewing areas of the second surface 130, i.e., the musical reference tools. The chord progression map 150 shown in FIG. 14 on the second surface 130 is for illustration purposes only; in the preferred embodiment, one or more different musical reference tools may be presented on the second surface.

FIGS. 4, 8, and 11: Example Data Sheets

As illustrated in FIGS. 4, 8, and 11, a data sheet generally includes one or more grids of note values, names, intervals, and/or chords. The data are arranged in conjunction with the various graphic tools, described below, such that various key-related musical forms and structures become apparent as a function of the relative positions of the two surfaces.

FIGS. 1–3, 5–7, 9, and 10: Musical Reference Tools

The abstract nature of musical concepts and their nearly endless relationships may be made concrete in various embodiments of the musical reference device. The musical reference device represents tonal intervals graphically to display music theory concepts in spatial terms. It illustrates musical principles and is not simply a dial-the-answer tool. In one embodiment, the musical reference device includes, but is not limited to, one or more of the following tools: a harmonized diatonic scale calculator, a chord substitution selector, a chord progression map, an alternate scale selector, a key transposer and interval counter, and a circle of fifths and clefs reminder.

FIG. 1: The Harmonized Diatonic Scale Calculator

In one embodiment, the musical reference device may include a harmonized diatonic scale calculator. As shown in FIG. 1, the harmonized diatonic scale calculator displays with graphic clarity the harmonized diatonic scale in every key. The notes of each diatonic mode may be displayed showing their natural sequence of tones from the tonic to the thirteenth step. Each note of a scale counted from the tonic, or root tone, is known as a degree. For example, the thirteenth degree in the key of C major is A, counting thirteen notes up from the tonic. The roots for each mode may be determined by the notes of the diatonic scale.

The harmonized diatonic scale calculator may be marked with major and minor intervals (and combinations) to aid the musician with chord construction and teach the student the building blocks of chord structure. The layout allows the musician to quickly create complex extended chords (chords that contain more than three notes) with multiple degrees and/or inversions. The harmonized diatonic scale calculator also shows the musician who wants to play lead or improvise which notes harmonize with a given chord. The notes shown making up that chord become the basis for arpeggios, melodies, or lead improvisation. The harmonized diatonic scale calculator also shows chord construction based on intervals up to the thirteenth degree, as well as the modes that underlie each diatonic scale, indicating the name of each degree. These scale and mode patterns are presented in unique spatial terms. It should be noted that the musical reference device displays notes with two names (e.g., A# and Bb) as separate notes. It should also be noted that the outer second surface may be interchangeable with other sleeves that harmonize alternate scales, e.g., harmonic and melodic minor scales.

The corresponding musical data sheet for one embodiment of the harmonized diatonic scale calculator tool is shown in FIG. 4.

Figure 2:
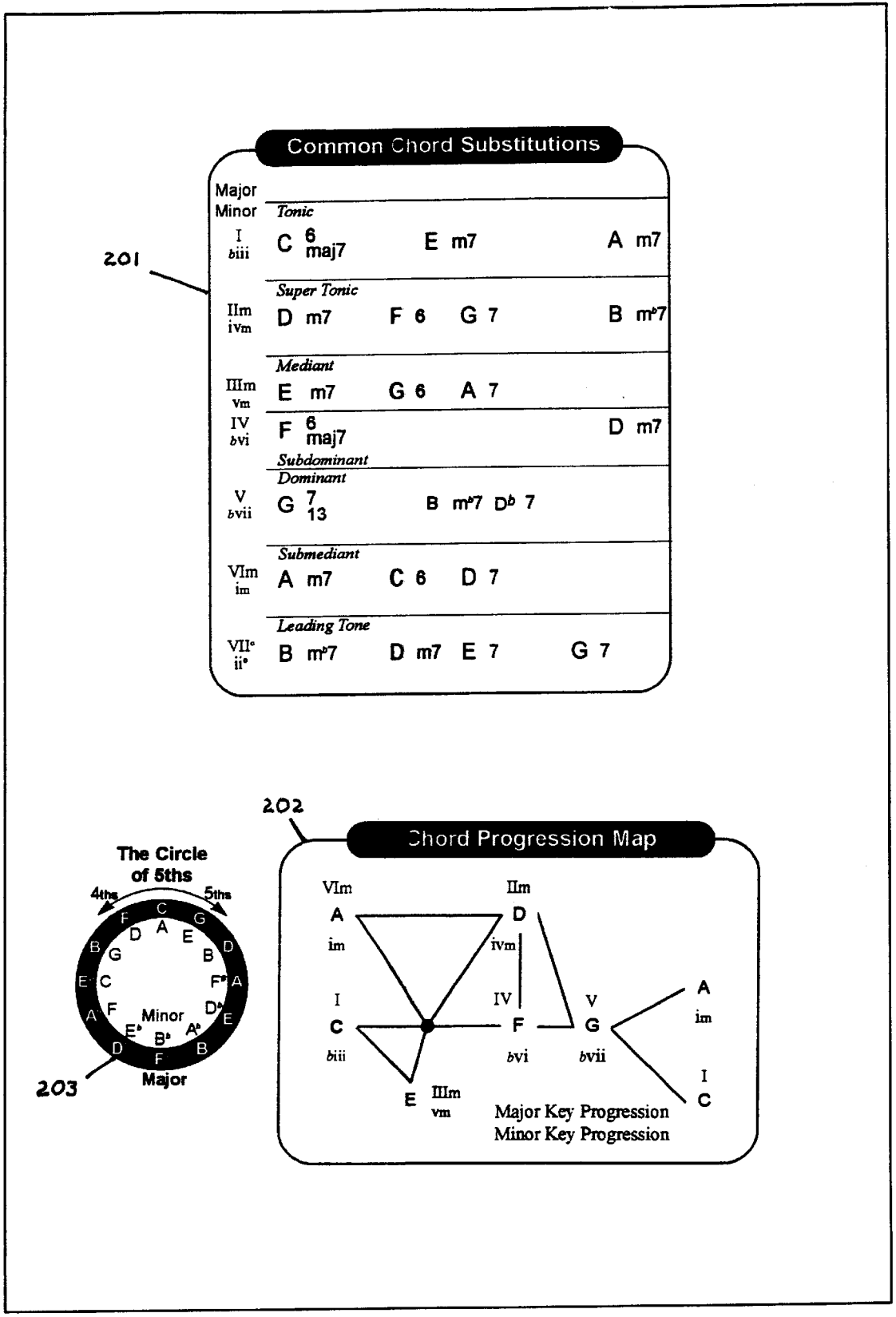
FIG. 2 is an illustration of a chord substitution selector, a chord progression map, and a circle of fifths diagram according to one embodiment.

FIG. 2: Chord Substitution Selector, Chord Progression Map, and Circle of Fifths In one embodiment, the musical reference device may include a chord substitution selector 201. As illustrated in FIG. 2, the chord substitution selector 201 shows chords that can be substituted for any given chord within a given key without violating the accepted rules of harmony. A musician may use this section to select chords that offer different harmonic voicing to chords that naturally occur in that key. For example, an A minor seventh chord has the same notes as a C six chord. Therefore, these chords can be substituted for each other. This tool is designed to reveal the proper substitution without the musician needing to be knowledgeable about the rules of chord substitution.

Since the chords represented in this section are integrally related to the harmonized diatonic scale calculator discussed with reference to FIG. 1, the musician can eventually learn the notes that make up the suggested substitutions and the relationship those notes have within the mode the chord may be based on.

This tool helps the musician develop harmony around a given melody or change the sound of an existing piece of music. This tool also aids the improviser by offering a variety of harmonic possibilities. For example, the sound of a C major differs from the more jazzy sound of a C major seventh. The student can learn the fundamentals of chord voicing by seeing the relationships of the notes within the substituted chords.

In one embodiment, one of the reference tools included in the musical reference device may be a chord progression map 202. As shown in FIG. 2, the chord progression map 202 may include a diagram of a plurality of chords with connections from each of the chords to one or more other of the chords, wherein the connections may be sequences of one or more intervening lines, such that any chord is reachable from any other chord by traversal of the intervening lines and chords. A user may select a beginning chord and an ending chord from the plurality of chords, and by traversing the chord progression map from the starting chord to the ending chord along a path of intervening lines, generate a sequence of chords, comprising the starting chord, any intervening chords, and the ending chord. This sequence of chords denotes a chord progression. When the second surface is moved with respect to the first surface, the chord progression map may be displayed in a plurality of keys as a function of the musical information and the relative position of the second surface with the first surface. The map works by beginning on the major or minor tonic and moving along the lines as they connect to other letters representing the root of the chord in the progression. As long as the path between chords is followed the resulting harmony will follow the standard rules.

The chord progression map 202 shows the most common chord progressions and how they are related. The chord progression map 202 map shows the musician what chords commonly occur in a given key. The mapping emphasizes the movement of harmony from one chord to another and suggests alternate harmonic routes to the composer and improviser. The mapping is based on the most common movements of harmony from one chord to another and provides multiple routes to the composer and improviser. Chords move in a particular order based on certain harmonic rules; by following the map, however, the musician can create harmonic movement without knowing the rules.

This tool demonstrates to the music student the basic chord structures that are dominant in Western music, including pop, jazz, rock, country, and classical music. The chords appearing this tool can be a springboard to the musician who wishes to experiment with alternate tonal qualities by making substitutions suggested by the chord substitution selector, described above.

In one embodiment, the musical reference device may include a circle of fifths 203. As FIG. 2 shows, the circle of fifths 203 shows the relationship between notes separated by two common intervals, namely 4ths and 5ths.

The corresponding musical data sheet for one embodiment of the chord substitution selector 201 and chord progression map 202 tools is shown in FIG. 4.

Figure 3:
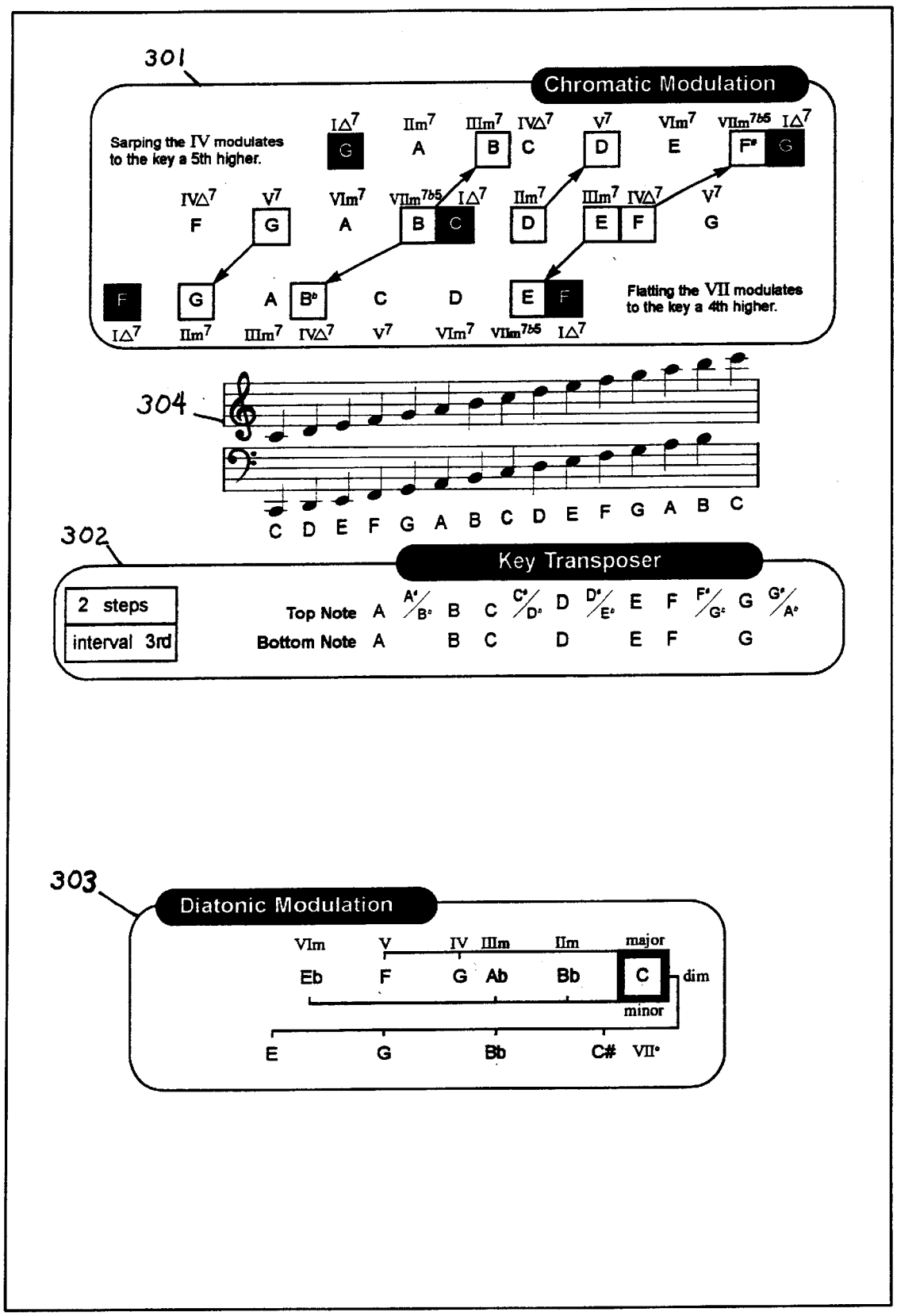
FIG. 3 is an illustration of a chord modulator, key transposer, interval counter, and clef reminder according to one embodiment.

FIG. 3: Chord Modulator, Key Transposer, Interval Counter, and Clef Reminder

In one embodiment, the musical reference device may include chord modulators 301 and 303. Chord modulation refers to the ways in which a musician can change keys while playing a piece of music. In some songs the key change may be immediate and noticeable for effect. In this case it may be permissible to change to any key by playing any sequence of chords. However, most often the key changes are subtle but add significantly to the texture and mood of a musical composition. In this case, two principles of modulation are often involved: diatonic and chromatic.

As shown in FIG. 3, diatonic modulation 303 works by moving from key to key by playing chords that are common to both keys. For example, a C major chord occurs in the scales of C, F, and G. The C major is the tonic chord in C and occupies the V position in F and the IV position in G. Therefore, this chord can be used to "pivot" into any of these keys.

Referring to FIG. 3, chromatic modulation 301 refers to changing one note of an existing chord to match the key signature of the key the harmony moves toward. For example, in the key of C major, D minor naturally occurs and is made up of notes D,F,A. If, however, the F is changed to an F#, then the triad becomes D,F#,A which is D major and occurs naturally in the key of G.

The chord modulators 301 and 303 represent the modulation techniques to graphically allow quick identification of the chords that achieve the proper modulation.

In one embodiment, the musical reference device may include a key transposer and interval counter 302, as illustrated by FIG. 3. The key transposer 302 may allow the musician to transpose music note for note from one key to another. This is an especially helpful tool for the composer who must write music for different instruments.

The interval counter 302 is an integral part of the key transposer 302. It tells the musician the interval between the original key and the new key. This can also be used to determine the interval between any two notes and the number of steps between them. The interval counter 302 may also display the name of the interval between any two notes.

In one embodiment, the musical reference device may include a clefs reminder 304. As shown in FIG. 3, the clefs reminder 304 shows four octaves of the C scale represented on the bass and treble clef. This handy reference may be useful to the beginning musician who wishes to know how a particular note is written according to standard musical notation.

The corresponding musical data sheet for one embodiment of the chord modulators 301 and 303, key transposer and interval counter 302 tools is shown in FIG. 4.

Figure 5:
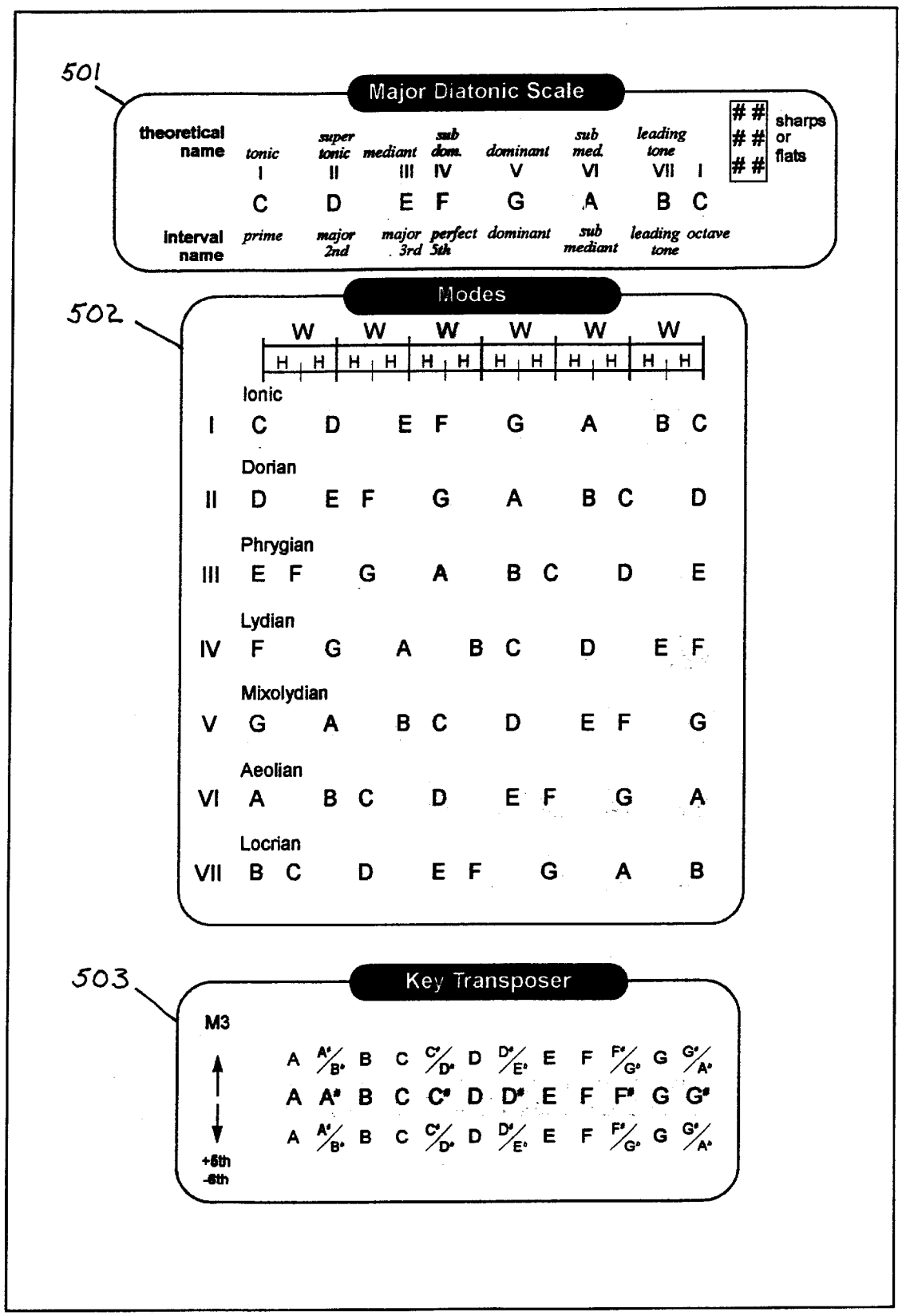
FIG. 5 is an illustration of a major diatonic scale reference, mode reference, and key transposer reference according to one embodiment.

FIG. 5: Major Diatonic Scale, Modes, and Key Transposer Reference

In one embodiment, the musical reference device may include a major diatonic scale tool 501. FIG. 5 illustrates the diatonic scale and shows labels for the notes and intervals that make it up. Understanding this basic terminology may be essential to comprehending all other elements of music theory. Because scales are often described by the number of sharps or flats they contain, this tool displays this information for each key.

In one embodiment, the musical reference device may include a modes tool 502. As FIG. 5 illustrates, the modes tool 502 shows the modes that relate to the diatonic scale represented in the section above it. These modes are essentially the major scale started and stopped on different notes of the given scale. The modes tool 502 labels and lays out these modes to show the chromatic steps that make up each mode.

In one embodiment, the musical reference device may include a key transposer tool 503. As shown in FIG. 5, the key transposer 503 displays the notes of a given key which correspond to the root key. The key transposer 503 also indicates which degree is generated by the key interval, depending upon whether the interval is up or down from the root.

The corresponding musical data sheet for one embodiment of the major diatonic scale 501, modes 502, and key transposer 503 tools is shown in FIG. 8.

Figure 6:
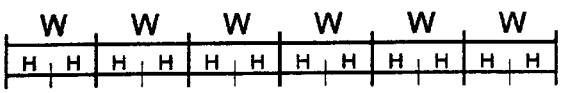
FIG. 6 is an illustration of a scale forms reference according to one embodiment.

FIG. 6: Scale Forms Reference

In one embodiment, the musical reference device may include a scale forms reference tool. As is illustrated in FIG. 6, the scale forms reference tool displays the notes in each scale form and the chromatic steps that make up those scales. This tool allows the user to see the relationships between different scale forms. For example, the difference between the harmonic and melodic minor is that the sixth note is flatted in the harmonic. The way the scales are presented allows the music student to understand them in terms of steps and intervals and compare them to the diatonic scale. At the top of this tool is the major diatonic scale. The major diatonic scale is the most prevalent in European and American music, including classical, jazz, country, folk, pop, etc. Below it are several alternative scale forms that appear in music with varying degrees of frequency.

The corresponding musical data sheet for one embodiment of the scale forms reference tool is shown in FIG. 8.

Figure 7:
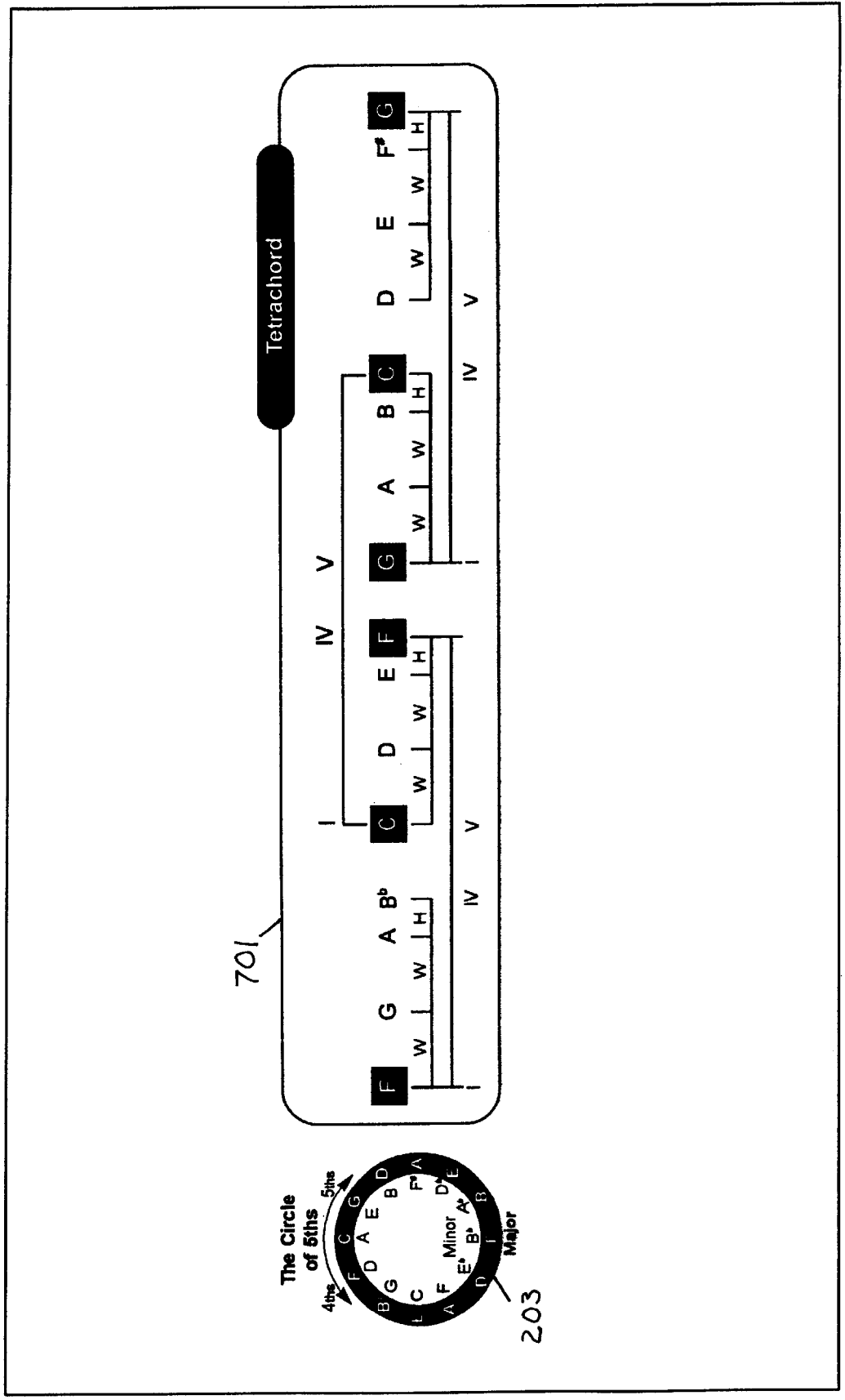
FIG. 7 is an illustration of a tetrachord reference according to one embodiment.

FIG. 7: The Tetrachord Reference

In one embodiment, the musical reference device may include a tetrachord tool 701. As is illustrated in FIG. 7, the diatonic scale is based on the tetrachord, a four-note chord consisting of two whole steps and a half step. This pattern repeats up and down the chromatic scale to create the twelve separate major keys used in music. This tool also demonstrates the principle behind the circle of fifths 203, also shown in FIG. 7.

The corresponding musical data sheet for one embodiment of the tetrachrord reference tool 701 is shown in FIG. 8.

Figure 9:
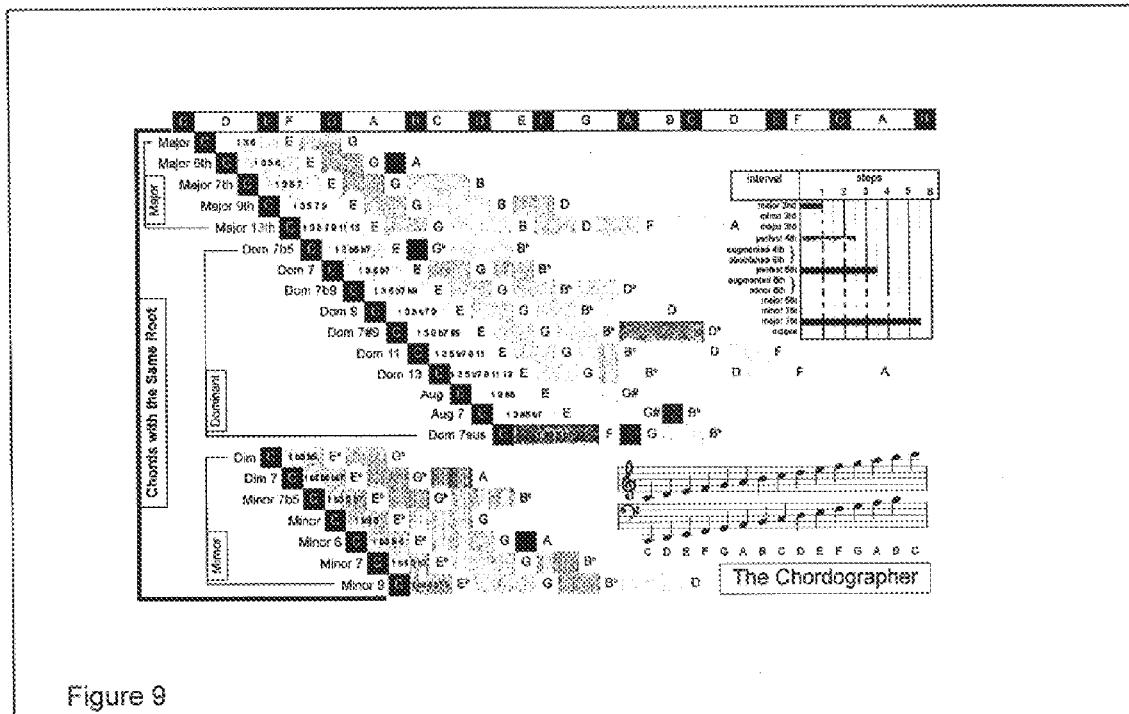
FIG. 9 is an illustration of a common root chord reference according to one embodiment.

FIG. 9: Common Root Chord Reference

In another embodiment, the musical reference device may include a common root chord reference tool. The common root chord reference tool displays chords relating to a common tonic root, which is another way to study chords. Referring to FIG. 9, the common root chord reference tool shows the most commonly occurring chords that share the same root and the intervals that comprise them. These chords are grouped into three categories: major, minor, and dominant. The chord formula of intervals that make up each chord is displayed next to the root. A legend showing all possible intervals and the chromatic steps they represent is also presented.

The corresponding musical data sheet for one embodiment of the common root chord reference tool is shown in FIG. 11.

Figure 10:
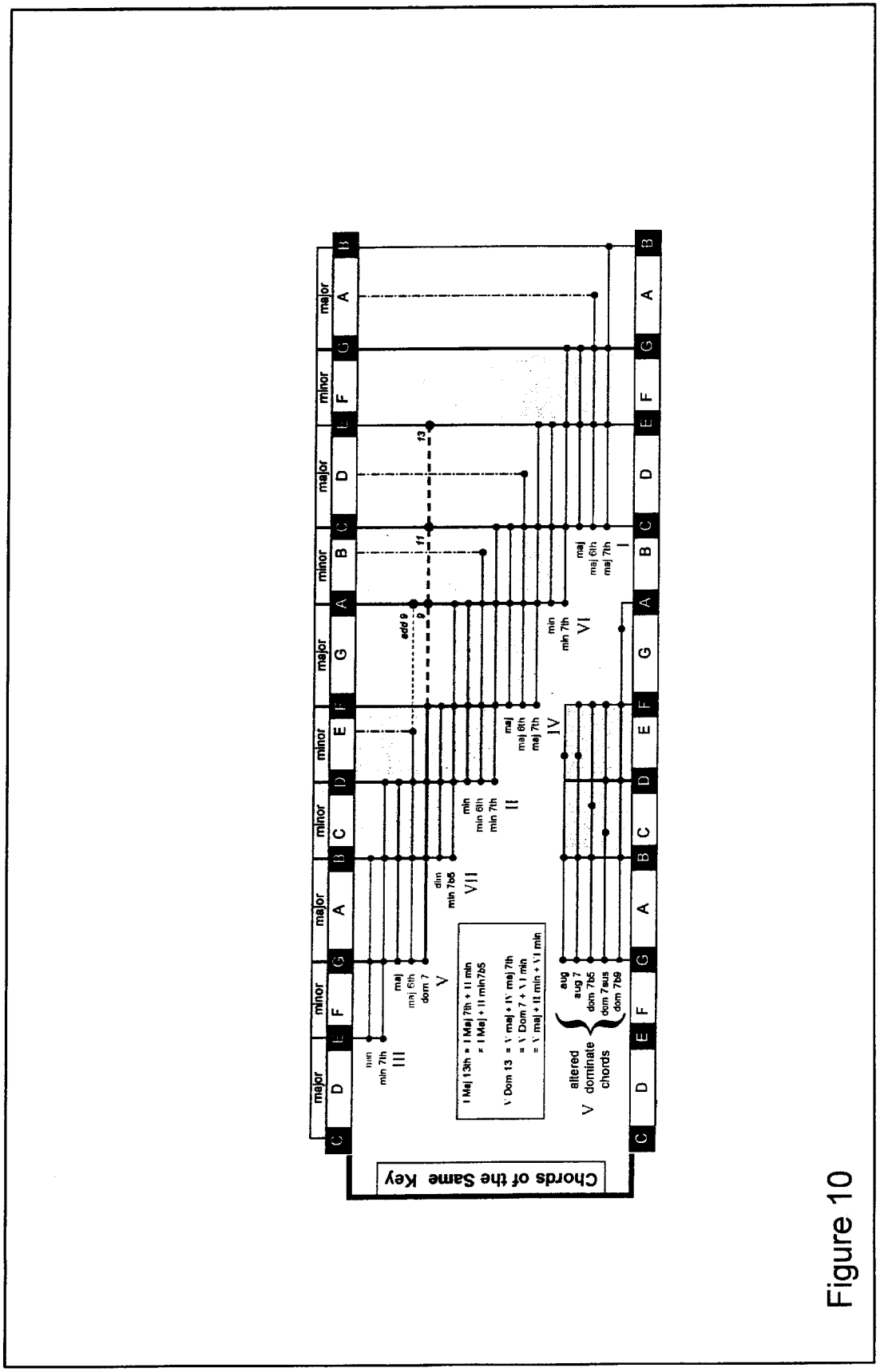
FIG. 10 is an illustration of a common key chord reference according to one embodiment.

FIG. 10: Common Key Chord Reference

In one embodiment, the musical reference device may include a common key chord reference tool. As FIG. 9 illustrates, this tool emphasizes the intervals that make up each chord, namely major and minor, and demonstrates the principle of polychords. The pattern of chord construction is the same in every key, so when the chord reference tool is dialed to a particular key, the chords harmonically associated with that key are revealed by a grid design that indicates the notes that make up that particular chord. The chord reference tool also shows how larger chords are actually made up of smaller chords. A chord that can be made from smaller ones is a polychord.

For example, referring to FIG. 9, in the key of C major one could look across the notes in the scale to find D. Following the line down from D, one will see the chords in this key that contain this note. The note appears in different locations in each of these chords and therefore plays a different harmonic function. Following the line down to the location marked "min $7^{th}$" (where D is the root note) one can trace the lines to the right that show the notes that make up the D minor seventh chord. From the point marked "min $7^{th}$" one can follow to the right one note then down one level to come to the point marked "maj." This is the root position for the F major chord. Comparing the line that represents F major with the one that represents D minor seventh, one sees that the F major chord actually makes up the last three notes of D minor seventh. This means that F major can be played when a D minor seventh appears in a piece of music, leaving the D note as an implied root.

Another important relationship that this tool illustrates is known as chord inversion. These are chords containing exactly the same notes, but they are arranged in different order. For example, in the key of C major the chord known as B minor seven flat five has the same notes as D minor sixth. This makes the two chords virtually interchangeable when playing a piece of music.

The corresponding musical data sheet for one embodiment of the common key chord reference tool is shown in FIG. 11.

Combinations of the Musical Reference Tools

In various embodiments, the above-mentioned tools might be grouped together in various ways. For example, the reference tools associated with the harmonic aspects of Western music may be grouped together in a music reference device which may be called the Harmonizer. The Harmonizer emphasizes the harmonized diatonic scale. It displays in graphic format the harmonic structure of the diatonic scale in all keys. The Harmonizer is an interactive reference tool that organizes musical concepts including chord harmonies, chord progressions, cord substitutions, modes, key transpositions, and alternative scales. The Harmonizer may include the following tools:

1) the harmonized diatonic scale calculator;
2) the chord substitution selector;
3) the chord progression map;
4) the chord modulator;
5) the key transposer and interval counter; and
6) the circle of fifths and clefs reminder.

An alternate embodiment primarily concerned with chord theory might be referred to as the Chordographer. The Chordographer emphasizes chord construction. It displays in a unique graphic format that shows the building blocks for each chord. It shows the intervals (the space between notes) that make up each chord and how each chord relates to others in a given key. The Chordographer shows chords in two ways. First, it shows chords relating to a given key. Second, it shows chords relating to a common tonic root. The Chordographer may include the following reference tools:

1) the common root chord reference; and
2) the common key chord reference.

Another embodiment might specifically relate to scales and be referred to as the Scaleographer. The Scaleographer emphasizes scale patterns, displaying several common scales and modes that musicians should know. The Scaleographer may include:

1) the major diatonic scale reference;
2) the modes reference;
3) the key transposer;
4) the scale forms reference; and
5) the tetrachord reference.

In various embodiments, the various groupings of tools such as the Harmonizer, the Chordographer, and the Scaleographer may be provided on interchangeable sets of first and second surfaces which may be used with a single cylinder, as shown in FIG. 12.

In one embodiment, the device may have interchangeable parts that allow other non-diatonic scales to be harmonized, or reference tools designed to address the individual characteristics of musical instruments (e.g., chord finger or tabulature for a guitar). In addition, the device could be designed to demonstrate musical notation of a given chord. In one embodiment, the device may include electronics that produce the sound of selected notes and chords.

The concepts of the musical reference device may be expressed in other embodiments as well, such as: a handheld electronic device similar to a calculator, software program to be run on a computer, see FIG. 13 below, or an analog device that is based on a scroll rather than a cylinder, as shown in FIG. 14 below.

Figure 13:
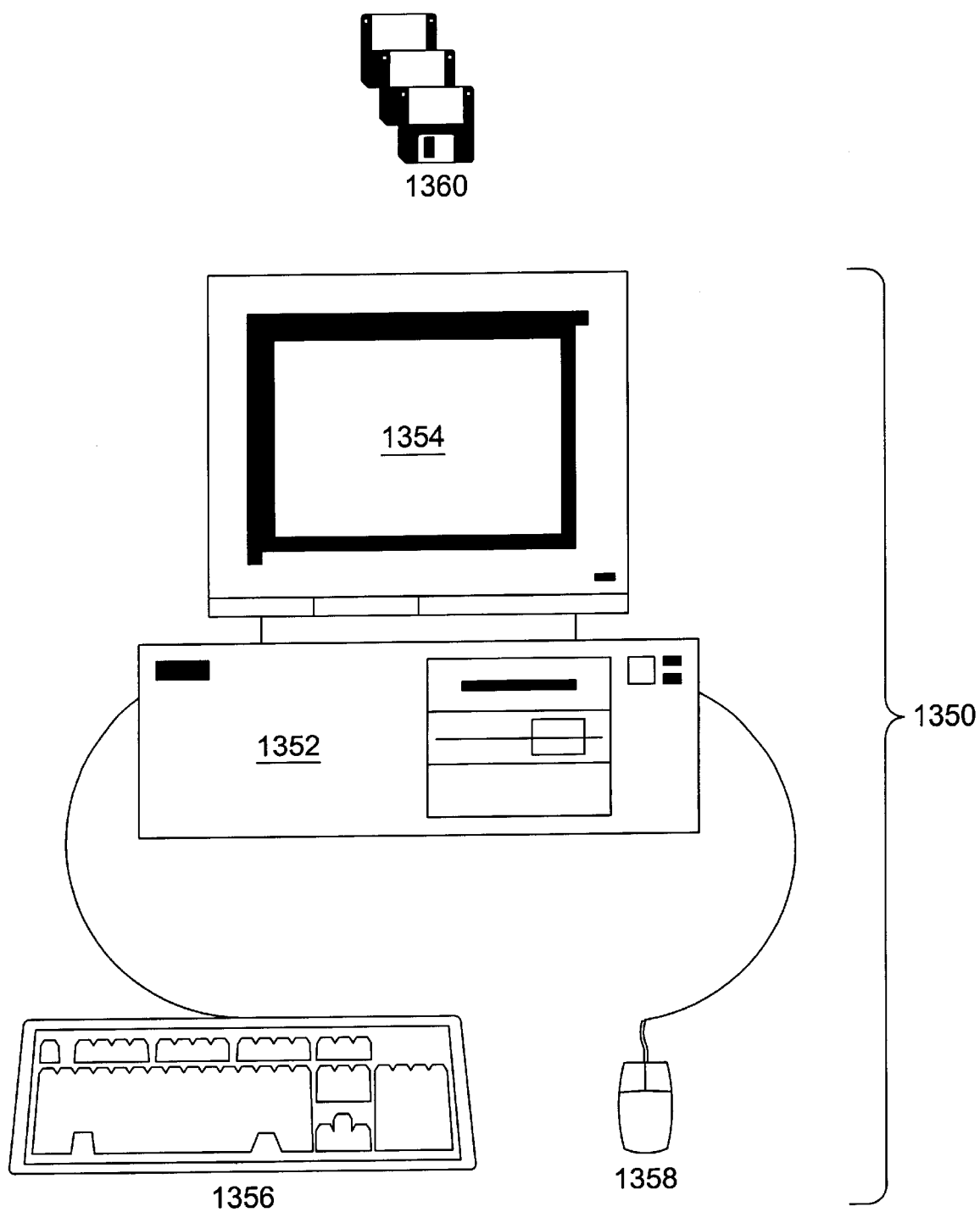
FIG. 13 illustrates a typical computer system which is suitable for implementing various embodiments of the invention.

FIG. 13: A Typical Computer System

FIG. 13 illustrates a typical computer system 1350 which is suitable for implementing various embodiments. Each computer system 1350 typically includes components such as a CPU 1352 with an associated memory medium, represented by floppy disks 1360. The memory medium may store program instructions for computer programs, wherein the program instructions are executable by the CPU 1352. The computer system 1350 may further include a display device such as a monitor 1354, an alphanumeric input device such as a keyboard 1356, and a directional input device such as a mouse 1358. The computer system 1350 may be operable to execute the computer programs to implement a musical reference system and method as described herein.

The computer system 1350 preferably includes a memory medium on which computer programs according to various embodiments may be stored. The term "memory medium may include an installation medium, e.g., a CD-ROM, or floppy disks 1360, a computer system memory such as DRAM, SRAM, EDO RAM, Rambus RAM, etc., or a non-volatile memory such as a magnetic media, e.g., a hard drive, or optical storage. The memory medium may include other types of memory as well, or combinations thereof. In addition, the memory medium may be located in a first computer in which the programs are executed, or may be located in a second different computer which connects to the first computer over a network. In the latter instance, the second computer provides the program instructions to the first computer for execution. Also, the computer system 1350 may take various forms, including a personal computer system, mainframe computer system, workstation, network appliance, Internet appliance, personal digital assistant (PDA), television system or other device. In general, the term "computer system" can be broadly defined to encompass any device having a processor which executes instructions from a memory medium.

The memory medium preferably stores a software program or programs for musical reference according to the systems and methods described herein. The software program(s) may be implemented in any of various ways, including procedure-based techniques, component-based techniques, and/or object-oriented techniques, among others. For example, the software program may be implemented using ActiveX controls, C++ objects, JavaBeans, Microsoft Foundation Classes (MFC), or other technologies or methodologies, as desired. A CPU, such as the host CPU 1352, may be operable to execute code and data from the memory medium.

In one embodiment of the invention, each graphical musical tool may be presented on a computer screen in a separate window, allowing multiple tools to be viewed and used concurrently. In another embodiment, one tool at a time may be used by selecting it from a menu or toolbar, or by selecting an icon with a pointing device such as a mouse. The musical key selection for a tool may be made by selecting a value from a display via a pointing device, in one embodiment. In another embodiment, the musical key selection for a tool may be input into a variable field. In yet another embodiment, the musical key selection may be made by scrolling through the musical key data values until a desired value is visible in the appropriate data field.

While the present invention has been described with reference to particular embodiments, it will be understood that the embodiments are illustrated and that the invention scope is not so limited. Any variations, modifications, additions and improvements to the embodiments described are possible. These variations, modifications, additions and improvements may fall within the scope of the invention as detailed within the following claims.

What is claimed is:

1. A device for musical reference, the device comprising:
   a first surface, whereupon is presented musical information, wherein the musical information comprises columns of note values;
   a second surface, whereupon is presented one or more music reference tools, wherein the second surface is operable to move with respect to the first surface;
   wherein the musical information comprises a viewable portion and a hidden portion, wherein the viewable portion and the hidden portion vary as a function of the position of the second surface with respect to the first surface;
   wherein the second surface is operable to display musical relationships in a plurality of keys for each of the music reference tools as a function of the viewable portion of the musical information;
   wherein the one or more music reference tools comprise a chord progression map, wherein the chord progression map is key-independent; and
   wherein the second surface is operable to display the chord progression map in a plurality of keys as a function of the musical information.

2. The device of claim 1,
   wherein the one or more music reference tools further comprise a diagram of a harmonized scale with modes, wherein the diagram of the harmonized scale with modes is key-independent; and
   wherein the second surface is further operable to display the harmonized scale with modes in a plurality of keys as a function of the musical information.

3. The device of claim 2,
   wherein the harmonized scale comprises a harmonized diatonic scale.

4. The device of claim 2,
   wherein the harmonized scale comprises a harmonized harmonic minor scale.

5. The device of claim 2,
   wherein the harmonized scale comprises a harmonized melodic minor scale.

6. The device of claim 1,
   wherein the one or more music reference tools further comprise a diagram of scale forms, wherein the diagram of scale forms is key-independent; and
   wherein the second surface is further operable to display the scale forms in a plurality of keys as a function of the musical information.

7. The device of claim 1,
   wherein the one or more music reference tools further comprise a diagram of chord substitutions, wherein the diagram of chord substitutions is key-independent; and
   wherein the second surface is further operable to display the chord substitutions in a plurality of keys as a function of the musical information.

8. The device of claim 1,
   wherein the one or more music reference tools further comprise a diagram of a key transposer and interval counter, wherein the diagram of the key transposer and interval counter is key-independent; and
   wherein the second surface is further operable to display the key transposer and interval counter in a plurality of keys as a function of the musical information.

9. The device of claim 1,
   wherein the one or more music reference tools further comprise:
   a diagram of the circle of fifths; and
   a clef reference.

10. The device of claim 1,
    wherein the one or more music reference tools further comprise a chord modulator, wherein the chord modulator is key-independent; and
    wherein the second surface is further operable to display the chord modulator in a plurality of keys as a function of the musical information.

11. The device of claim 1,
    wherein the one or more music reference tools further comprise a common root chord reference, wherein the common root chord reference is key-independent; and
    wherein the second surface is further operable to display the common root chord reference in a plurality of keys as a function of the musical information.

12. The device of claim 1,
    wherein the one or more music reference tools further comprise a common key chord reference, wherein the common key chord reference is key-independent; and
    wherein the second surface is further operable to display the common key chord reference in a plurality of keys as a function of the musical information.

13. The device of claim 1,
wherein the one or more music reference tools further comprise a major scale reference, wherein the major scale reference is key-independent; and
wherein the second surface is further operable to display the major scale reference in a plurality of keys as a function of the musical information.

14. The device of claim 1,
wherein the one or more music reference tools further comprise a modes reference, wherein the modes reference is key-independent; and
wherein the second surface is further operable to display the modes reference in a plurality of keys as a function of the musical information.

15. The device of claim 1,
wherein the one or more music reference tools further comprise a key transposer, wherein the key transposer is key-independent; and
wherein the second surface is further operable to display the key transposer in a plurality of keys as a function of the musical information.

16. The device of claim 1,
wherein the one or more music reference tools further comprise a tetrachord reference, wherein the tetrachord reference is key-independent; and
wherein the second surface is further operable to display the tetrachord reference in a plurality of keys as a function of the musical information.

17. The device of claim 1,
wherein the second surface comprises a plurality of perforations, whereby the viewable portion of the musical information may be viewed through the perforations.

18. The device of claim 1,
wherein the second surface comprises a plurality of transparent areas, whereby the viewable portion of the musical information may be viewed through the transparent areas.

19. The device of claim 1,
wherein the first surface comprises the surface of a cylinder;
wherein the second surface comprises a movable sleeve, wherein the movable sleeve is operable to rotate about the axis of the cylinder.

20. The device of claim 19, wherein the cylinder is hollow to provide a storage space for auxiliary items.

21. The device of claim 19,
wherein the movable sleeve is interchangeable with one or more alternative sleeves, wherein each of the alternative sleeves presents an alternative set of musical reference tools.

22. The device of claim 19,
wherein the first surface further comprises an inner sleeve which is fixed to the cylinder, wherein the musical information is presented upon the inner sleeve.

23. The device of claim 22,
wherein the inner sleeve is interchangeable with alternative inner sleeves, wherein each of the alternative inner sleeves presents an alternative set of musical information.

24. A device for musical reference, the device comprising:
a three-dimensional object, whereupon is presented musical information;
a movable sleeve, whereupon is presented one or more music reference tools, wherein the movable sleeve is operable to move with respect to the three-dimensional object;
wherein the musical information comprises a viewable portion and a hidden portion, wherein the viewable portion and the hidden portion vary as a function of the position of the movable sleeve with respect to the three-dimensional object; and
wherein the movable sleeve is operable to display musical relationships in a plurality of keys for each of the music reference tools as a function of the viewable portion of the musical information.

25. The device of claim 24,
wherein the one or more music reference tools comprise a chord progression map, wherein the chord progression map is key-independent; and
wherein the movable sleeve is operable to display the chord progression map in a plurality of keys as a function of the musical information.

26. The device of claim 24,
wherein the one or more music reference tools further comprise a diagram of a harmonized scale with modes, wherein the diagram of the harmonized scale with modes is key-independent; and
wherein the movable sleeve is further operable to display the harmonized scale with modes in a plurality of keys as a function of the musical information.

27. The device of claim 26,
wherein the harmonized scale comprises a harmonized diatonic scale.

28. The device of claim 26,
wherein the harmonized scale comprises a harmonized harmonic minor scale.

29. The device of claim 26,
wherein the harmonized scale comprises a harmonized melodic minor scale.

30. The device of claim 24,
wherein the one or more music reference tools further comprise a diagram of scale forms, wherein the diagram of scale forms is key-independent; and
wherein the movable sleeve is further operable to display the scale forms in a plurality of keys as a function of the musical information.

31. The device of claim 24,
wherein the one or more music reference tools further comprise a diagram of chord substitutions, wherein the diagram of chord substitutions is key-independent; and
wherein the movable sleeve is further operable to display the chord substitutions in a plurality of keys as a function of the musical information.

32. The device of claim 24,
wherein the one or more music reference tools further comprise a diagram of a key transposer and interval counter, wherein the diagram of the key transposer and interval counter is key-independent; and
wherein the movable sleeve is further operable to display the key transposer and interval counter in a plurality of keys as a function of the musical information.

33. The device of claim 24,
wherein the musical information comprises columns of note values.

34. The device of claim 24,
wherein the one or more music reference tools further comprise a chord modulator, wherein the chord modulator is key-independent; and
wherein the movable sleeve is further operable to display the chord modulator in a plurality of keys as a function of the musical information.

35. The device of claim 24,
wherein the one or more music reference tools further comprise a common root chord reference, wherein the common root chord reference is key-independent; and
wherein the movable sleeve is further operable to display the common root chord reference in a plurality of keys as a function of the musical information.

36. The device of claim 24,
wherein the one or more music reference tools further comprise a common key chord reference, wherein the common key chord reference is key-independent; and
wherein the movable sleeve is further operable to display the common key chord reference in a plurality of keys as a function of the musical information.

37. The device of claim 24,
wherein the one or more music reference tools further comprise a major scale reference, wherein the major scale reference is key-independent; and
wherein the movable sleeve is further operable to display the major scale reference in a plurality of keys as a function of the musical information.

38. The device of claim 24,
wherein the one or more music reference tools further comprise a modes reference, wherein the modes reference is key-independent; and
wherein the movable sleeve is further operable to display the modes reference in a plurality of keys as a function of the musical information.

39. The device of claim 24,
wherein the one or more music reference tools further comprise a key transposer, wherein the key transposer is key-independent; and
wherein the movable sleeve is further operable to display the key transposer in a plurality of keys as a function of the musical information.

40. The device of claim 24,
wherein the one or more music reference tools further comprise a tetrachord reference, wherein the tetrachord reference is key-independent; and
wherein the movable sleeve is further operable to display the tetrachord reference in a plurality of keys as a function of the musical information.

41. The device of claim 24,
wherein the movable sleeve comprises a plurality of perforations, whereby the viewable portion of the musical information may be viewed through the perforations.

42. The device of claim 24,
wherein the movable sleeve comprises a plurality of transparent portions, whereby the viewable portion of the musical information may be viewed through the transparent portions.

43. The device of claim 24,
wherein the three-dimensional object is hollow to provide a storage space for auxiliary items.

44. The device of claim 24,
wherein the movable sleeve is interchangeable with one or more alternative sleeves, wherein each of the alternative sleeves presents an alternative set of musical reference tools.

45. The device of claim 24, further comprising:
an inner sleeve which is fixed to the three-dimensional object, wherein the musical information is presented upon the inner sleeve.

46. The device of claim 45,
wherein the inner sleeve is interchangeable with alternative inner sleeves, wherein each of the alternative inner sleeves presents an alternative set of musical information.

47. The device of claim 24,
wherein the three-dimensional object is substantially cylindrical.

48. The device of claim 24,
wherein the movable sleeve is operable to rotate about the axis of the three-dimensional object.

49. The device of claim 24,
wherein the movable sleeve is operable to move along the axis of the three-dimensional object.

50. A method for constructing chord progressions, the method comprising:
selecting a beginning chord and an ending chord from a chord progression map, wherein the chord progression map comprises a plurality of chords with connections from each of the plurality of chords to one or more other of the plurality of chords, wherein the connections comprise sequences of one or more intervening line segments, such that any chord is reachable from any other chord by traversal of the intervening line segments and chords; and
traversing the chord progression map from the starting chord of the plurality of chords to the ending chord along a path of intervening line segments, thereby generating a sequence of chords comprising the starting chord, any intervening chords, and the ending chord, wherein the sequence of chords denotes a chord progression.

51. The method of claim 50,
wherein each chord in the chord progression map is labeled with a chord name.

52. The method of claim 50,
wherein each chord in the chord progression map comprises a chord position with respect to a root chord.

53. The method of claim 50,
wherein the chord progression map further comprises:
a portion of a plurality of columns of note values on a first surface; and
a plurality of chord positions on a second surface, wherein the second surface is operable to move with respect to the first surface, wherein the plurality of columns of note values comprise a viewable portion and a hidden portion, wherein the viewable portion and the hidden portion vary as a function of the position of the second surface with respect to the first surface; and
wherein the method further comprises:
moving the second surface with respect to the first surface to select a particular root chord value.

54. An apparatus for musical reference, the apparatus comprising:
a first three-dimensional object having at least one outer surface, wherein musical information is comprised on the at least one outer surface of the three-dimensional object;
a second three-dimensional object, wherein the first three-dimensional object is comprised within the second three-dimensional object, wherein the second three-dimensional object includes one or more transparent portions;
wherein one or more of the first three-dimensional object and the second three-dimensional object is moveable relative to the other to enable respective portions of the musical information to be aligned with the one or more transparent portions to enable the respective portions of the musical information to be viewed by a user.

55. The apparatus of claim 54,
wherein the first three-dimensional object and the second three-dimensional object are each a cylinder.

56. The apparatus of claim 54,
wherein the second three-dimensional object comprises at least one music reference tool, wherein the at least one music reference tool is operable to display at least one musical relationship as a function of the respective viewed portions of the musical information.

57. The apparatus of claim 56,
wherein the at least one music reference tool comprises a chord progression map, wherein the chord progression map is key-independent.

58. The apparatus of claim 56,
wherein the at least one music reference tool comprises a diagram of a harmonized scale with modes, wherein the diagram of the harmonized scale with modes is key-independent.

59. The apparatus of claim 58,
wherein the harmonized scale comprises a harmonized diatonic scale.

60. The apparatus of claim 58,
wherein the harmonized scale comprises a harmonized harmonic minor scale.

61. The apparatus of claim 58,
wherein the harmonized scale comprises a harmonized melodic minor scale.

62. The apparatus of claim 56,
wherein the at least one music reference tool comprises a diagram of scale forms, wherein the diagram of scale forms is key-independent.

63. The apparatus of claim 56,
wherein the at least one music reference tool comprises a diagram of chord substitutions, wherein the diagram of chord substitutions is key-independent.

64. The apparatus of claim 56,
wherein the at least one music reference tool comprises a diagram of a key transposer and interval counter, wherein the diagram of the key transposer and interval counter is key-independent.

65. The apparatus of claim 56,
wherein the at least one music reference tool comprises a chord modulator, wherein the chord modulator is key-independent.

66. The apparatus of claim 56,
wherein the at least one music reference tool comprises a common root chord reference, wherein the common root chord reference is key-independent.

67. The apparatus of claim 56,
wherein the at least one music reference tool comprises a common key chord reference, wherein the common key chord reference is key-independent.

68. The apparatus of claim 56,
wherein the at least one music reference tool comprises a major scale reference, wherein the major scale reference is key-independent.

69. The apparatus of claim 56,
wherein the at least one music reference tool comprises a modes reference, wherein the modes reference is key-independent.

70. The apparatus of claim 56,
wherein the at least one music reference tool comprises a key transposer, wherein the key transposer is key-independent.

71. The apparatus of claim 56,
wherein the at least one music reference tool comprises a tetrachord reference, wherein the tetrachord reference is key-independent.

72. The apparatus of claim 56, further comprising:
one or more additional three-dimensional objects which are interchangeable with the second three-dimensional object, wherein each of the one or more additional three-dimensional objects comprises an alternative set of music reference tools.

73. The apparatus of claim 54, further comprising:
one or more additional three-dimensional objects which are interchangeable with the first three-dimensional object, wherein each of the one or more additional three-dimensional objects comprises an alternative set of musical information.

74. The apparatus of claim 69,
wherein the musical information comprises columns of note values.

75. The apparatus of claim 69,
wherein the transparent portions comprise one or more perforations.

76. The apparatus of claim 69,
wherein the first three-dimensional object comprises a storage compartment.

77. A system for musical reference, the system comprising:
a CPU;
a memory coupled to the CPU, wherein the memory stores program instructions which are executable by the CPU to present:
one or more music reference tools which display musical relationships as a function of musical key;
wherein the one or more music reference tools comprise a chord progression map tool, wherein the chord progression map tool is operable to display a chord progression map in a plurality of keys as a function of a selected musical key;
wherein the one or more music reference tools comprise a diagram of a harmonized scale with modes, wherein the diagram of the harmonized scale with modes is operable to display the harmonized scale with modes in a plurality of keys as a function of a selected musical key.

78. The system of claim 77,
wherein the harmonized scale comprises a harmonized diatonic scale.

79. The system of claim 77,
wherein the harmonized scale comprises a harmonized harmonic minor scale.

80. The system of claim 77,
wherein the harmonized scale comprises a harmonized melodic minor scale.

81. A system for musical reference, the system comprising:
a CPU;
a memory coupled to the CPU, wherein the memory stores program instructions which are executable by the CPU to present:
one or more music reference tools which display musical relationships as a function of musical key;

wherein the one or more music reference tools comprise a chord progression map tool, wherein the chord progression map tool is operable to display a chord progression map in a plurality of keys as a function of a selected musical key;

wherein the one or more music reference tools comprise a diagram of scale forms, wherein the diagram of scale forms is operable to display scale forms in a plurality of keys as a function of a selected musical key.

82. A system for musical reference, the system comprising:

a CPU;

a memory coupled to the CPU, wherein the memory stores program instructions which are executable by the CPU to present:

one or more music reference tools which display musical relationships as a function of musical key;

wherein the one or more music reference tools comprise a chord progression map tool, wherein the chord progression map tool is operable to display a chord progression map in a plurality of keys as a function of a selected musical key;

wherein the one or more music reference tools comprise a diagram of chord substitutions, wherein the diagram of chord substitutions is operable to display a chord substitutions in a plurality of keys as a function of a selected musical key.

83. A system for musical reference, the system comprising:

a CPU;

a memory coupled to the CPU, wherein the memory stores program instructions which are executable by the CPU to present:

one or more music reference tools which display musical relationships as a function of musical key;

wherein the one or more music reference tools comprise a chord progression map tool, wherein the chord progression map tool is operable to display a chord progression map in a plurality of keys as a function of a selected musical key;

wherein the one or more music reference tools comprise a diagram of a key transposer and interval counter, wherein the diagram of the key transposer and interval counter is operable to display a key transposer and interval counter in a plurality of keys as a function of a selected musical key.

84. A system for musical reference, the system comprising:

a CPU;

a memory coupled to the CPU, wherein the memory stores program instructions which are executable by the CPU to present:

one or more music reference tools which display musical relationships as a function of musical key;

wherein the one or more music reference tools comprise a chord progression map tool, wherein the chord progression map tool is operable to display a chord progression map in a plurality of keys as a function of a selected musical key;

wherein the one or more music reference tools comprise a chord modulator tool, wherein the chord modulator tool is operable to display a chord modulator in a plurality of keys as a function of a selected musical key.

85. A system for musical reference, the system comprising:

a CPU;

a memory coupled to the CPU, wherein the memory stores program instructions which are executable by the CPU to present:

one or more music reference tools which display musical relationships as a function of musical key;

wherein the one or more music reference tools comprise a chord progression map tool, wherein the chord progression map tool is operable to display a chord progression map in a plurality of keys as a function of a selected musical key;

wherein the one or more music reference tools comprise a common root chord reference tool, wherein the common root chord reference tool is operable to display a common root chord reference in a plurality of keys as a function of a selected musical key.

86. A system for musical reference, the system comprising:

a CPU;

a memory coupled to the CPU, wherein the memory stores program instructions which are executable by the CPU to present:

one or more music reference tools which display musical relationships as a function of musical key;

wherein the one or more music reference tools comprise a chord progression map tool, wherein the chord progression map tool is operable to display a chord progression map in a plurality of keys as a function of a selected musical key;

wherein the one or more music reference tools comprise a common key chord reference tool, wherein the common key chord reference tool is operable to display a common key chord reference in a plurality of keys as a function of a selected musical key.

87. A system for musical reference, the system comprising:

a CPU;

a memory coupled to the CPU, wherein the memory stores program instructions which are executable by the CPU to present:

one or more music reference tools which display musical relationships as a function of musical key;

wherein the one or more music reference tools comprise a chord progression map tool, wherein the chord progression map tool is operable to display a chord progression map in a plurality of keys as a function of a selected musical key;

wherein the one or more music reference tools comprise a modes reference tool, wherein the modes reference tool is operable to display a modes reference in a plurality of keys as a function of a selected musical key.

88. A system for musical reference, the system comprising:

a CPU;

a memory coupled to the CPU, wherein the memory stores program instructions which are executable by the CPU to present:

one or more music reference tools which display musical relationships as a function of musical key;

wherein the one or more music reference tools comprise a chord progression map tool, wherein the chord progression map tool is operable to display a chord progression map in a plurality of keys as a function of a selected musical key;

wherein the one or more music reference tools comprise a key transposer tool, wherein the key transposer tool is operable to display a key transposer in a plurality of keys as a function of a selected musical key.

89. A system for musical reference, the system comprising:
   a CPU;
   a memory coupled to the CPU, wherein the memory stores program instructions which are executable by the CPU to present:
      one or more music reference tools which display musical relationships as a function of musical key;
   wherein the one or more music reference tools comprise a chord progression map tool, wherein the chord progression map tool is operable to display a chord progression map in a plurality of keys as a function of a selected musical key;
   wherein the one or more music reference tools comprise a tetrachord reference tool, wherein the tetrachord reference tool is operable to display a tetrachord reference in a plurality of keys as a function of a selected musical key.

* * * * *